United States Patent [19]

Takai et al.

[11] Patent Number: 5,136,570
[45] Date of Patent: Aug. 4, 1992

[54] DISC EJECTING STRUCTURE WITH PLURALITY OF DISK POSITION SENSORS

[75] Inventors: Kazuki Takai, Ichikawa; Yuuji Teraguchi; Mitsuo Nakatani, both of Toda, all of Japan

[73] Assignee: Clarion Co., Ltd., Tokyo, Japan

[21] Appl. No.: 582,141

[22] Filed: Sep. 13, 1990

[30] Foreign Application Priority Data

| Sep. 14, 1989 | [JP] | Japan | 1-237303 |
| Oct. 19, 1989 | [JP] | Japan | 1-272646 |
| Oct. 19, 1989 | [JP] | Japan | 1-272647 |
| Oct. 20, 1989 | [JP] | Japan | 1-273437 |

[51] Int. Cl.$^5$ ............... G11B 33/02; G11B 17/04; G11B 17/08
[52] U.S. Cl. .................. 369/77.1; 369/75.1; 369/187; 360/99.06
[58] Field of Search ............ 369/77.1, 77.2, 75.1, 369/75.2, 184, 187, 217; 360/99.02, 99.04, 99.06; 235/475, 476

[56] References Cited

U.S. PATENT DOCUMENTS

| 4,098,510 | 7/1978 | Suzuki et al. | 369/75.2 |
| 4,578,787 | 3/1986 | Shimizu et al. | 369/77.2 |
| 4,674,080 | 6/1987 | Higuchi et al. | 369/77.2 |
| 4,695,995 | 9/1987 | Koizumi | 369/75.2 |
| 4,733,314 | 3/1988 | Ogawa et al. | 369/77.2 X |
| 4,797,869 | 1/1989 | Hirano | 369/75.2 |
| 5,038,337 | 8/1991 | Muramatsu et al. | 369/77.1 |

*Primary Examiner*—John W. Shepperd
*Assistant Examiner*—Michael C. Kessell
*Attorney, Agent, or Firm*—Price, Gess & Ubell

[57] ABSTRACT

A disc ejecting structure capable of positively detecting the position of a disc during a disc ejecting operation to eject the disc from a disc player with safety and high reliability. The disc ejecting structure includes a plurality of disc detecting sensors which are so arranged that a disc which is in the course of ejection or at an ejection completing position is detected depending upon patterns of combination of detection and non-detection modes of the sensors.

18 Claims, 16 Drawing Sheets

DISC EJECTING STRUCTURE WITH PLURALITY OF DISK POSITION SENSORS

BACKGROUND OF THE INVENTION

1. Field of the Invention

This invention relates to a disc ejecting structure, and more particularly to a disc ejecting structure for, for example, a disc player such as a compact disc player, a laser disc player or the like.

2. Description of Related Art

For example, in a compact disc player used at a place at which it is easily exposed to vibration, shock or the like, such as a mounted-type compact disc player which is adapted to be mounted on a vehicle such as a car or the like, it is required to transfer a compact disc in the disc player for loading while keeping the disc safe as shown in FIG. 1. Such transfer permits the disc to be positively and safely loaded on a turntable of the disc player without being adversely affected by vibration or shock.

Now, a conventional disc transfer mechanism which is widely used for such a compact disc player will be described hereinafter with reference to FIG. 1. A disc transfer mechanism shown in FIG. 1 includes a housing 20 and a turntable 22 arranged in the interior of the housing 20. The housing 20 is provided on the front portion thereof with a disc port 24. Also, the disc transfer mechanism includes a transfer means or roller 26 which is arranged so as to be rotatable in both directions and positioned between the turntable 22 and the disc port 24. When a disc 28 is to be loaded in the disc player, the disc 28 which is inserted through the disc port 24, as shown in FIG. 2, is vertically interposed between the transfer roller 26 and a support member 30 arranged vertically opposite to the transfer roller 26. Then, the transfer roller 26 is rotated in one direction to transfer the disc 28 to a position above the turntable 22. In order to ensure that the disc 28 is accurately positioned above the turntable 22, a pair of positioning pins 32 are arranged at the rear section of a disc transfer passage defined in the housing 20. Such arrangement of the positioning pins 32 permits the peripheral edge of the disc 28 to be abutted against the pins 32 during the loading operation, to thereby align a central hole 34 of the disc 28 with the turntable 22. Then, the transfer roller 26 is lowered through a suitable lifting means (not shown) to lower the compact disc 28 onto the turntable 22 and then the disc is clamped or chucked by a clamping or chucking means (not shown), resulting in being ready for playing-back. When the disc 28 is to be ejected from the disc player, it is released from the clamping means and then the transfer roller 26 is raised by means of the lifting means to raise the disc 28. Subsequently, the transfer roller 26 is rotated in the other direction to transfer the disc 28 from the turntable 22 to a predetermined ejection completing position defined on the side of the disc port 24.

The most important trouble which is encountered with such a disc player loaded with a disc would be a failure in ejection of the loaded disc from the player. In order to prevent this type of trouble, the disc player is demanded to exhibit a function of positively ejecting the disc by repeating the disc ejecting operation, when the operation is failed although one ejection command is made or when the disc is not positively transferred to the ejection completing position although the ejecting operation takes place. For this purpose, the compact disc player including the disc transfer mechanism shown in FIGS. 1 and 2 employs an ejection detecting mechanism of the type that a timing of a disc injection operation which is carried out by a drive means such as a cam of a disc driving section, its gear or the like or the completion of the injecting operation is detected. More specifically, a mechanism is employed which is adapted to detect the position of a cam for lifting the disc.

Unfortunately, the conventional ejection detecting mechanism, as will be noted from thw foregoing, is adapted to indirectly detect completion of the disc ejecting operation through a timing of the drive means. Such construction of the mechanism causes the disc ejection to be erroneously detected, even when it is actually failed due to any difficulty although the drive means is actuated. Alternatively, it fails to detect the disc ejecting operation or the completion of the operation due to a failure in the timing of the drive means although the disc is actually fully ejected. The former is caused when repeating of the ejecting operation is not carried out, whereas the latter results in the actuation of the drive means being uselessly repeated.

It is widely known in the art that such disadvantages are also encountered with a disc player employing a disc transfer mechanism and/or an ejection detecting mechanism similarly constructed.

Thus, the conventional disc transfer mechanism fails to positively confirm or judge whether the disc is actually transferred to the ejection completing position or the disc ejecting operation is effectively accomplished, resulting in failing to positively eject the disc or useless repeating of the disc ejecting operation.

Also, in the prior art, a timing at which the completion of the disc ejecting operation is detected is determined by counting a predetermined length of time. Accordingly, when the disc strikes against any obstacle during the ejecting operation, the time elapses before the disc ejection operation is completed, so that the transfer roller 26 is often stopped before the disc reaches the ejection completing position. This leads to a failure in ejection of the disc from the disc player, resulting in interfering with loading of another disc in the disc player. Also, an attempt of forcibly removing the disc from the disc player or disc ejecting mechanism causes damage to the disc and/or application of overloading to the drive or loading roller 26, so that both disc and mechanism are broken.

In order to eliminate the problem, a disc loading device is proposed which is provided with an ejection completion detecting sensor for detecting whether the ejection is fully completed. Nevertheless, such an approach has important disadvantages. More particularly, if any force or vibration is accidentally or erroneously applied to the disc when removing the disc which has reached a disc ejecting position, it is undesirably loaded again in the disc loading device or disc player.

Also, the conventional disc transfer mechanism constructed as shown in FIGS. 1 and 2, as described above, is suitably used for a mounted-type disc player because it exhibits relatively satisfactory operability even under vibratory conditions. Recently, the demand of consumers on compact discs is diversified with rapid spread of the compact discs, leading to manufacturing of a compact disc of a diameter as small as 8 cm (8 cm compact disc) which is called a single CD in addition to the existing compact disc of 12 cm in diameter (12 cm compact disc). The 8 cm disc corresponds to an analog single disc of 17 cm in diameter. The appearance of the 8 cm disc causes some problems. More particularly, the conventional compact disc player is constructed so as to be accommodated to only the existing 12 cm compact disc, to thereby fail to distinguish the 8 cm compact disc and 12 cm compact disc from each other. Therefore, playing-back of the 8 cm compact disc requires the use of an exclusive adapter therefor, resulting in the operation being highly troublesome and the player being costly.

In order to eliminate the foregoing problem, a disc loading or transfer mechanism is proposed which includes a stopper arm for positioning a compact disc in place and holding it on a turntable. The stopper arm functions to detect any pressing force applied to thereto by a compact disc loaded in the mechanism to mechanically discriminate it, to thereby move between an operation position for a 12 cm compact disc and that for a 8 cm compact disc for the loading operation. Unfortunately, the proposed mechanical disc discriminating means is highly complicated in construction and fails to accurately discriminate a disc depending upon force of the disc applied thereto during the loading operation. Such a disadvantage is encountered with various disc players which is adapted to play back two or more discs difference in size, other than the compact disc player.

Further, it is proposed that the conventional disc transfer structure is provided with a single sensor, which is arranged between the disc port 24 and the transfer roller 26 for detecting the completion of loading of the disc 28. For example, such a sensor may comprises a photosensor arranged so as to be positioned slightly outside the outer periphery of the disc 28 when it is placed on the turntable 22. The sensor is adapted to exhibit a detection mode when it detects that something obstructs the sensor and a non-detection mode when there is nothing to obstruct the sensor. Thus, when the sensor takes the detection mode and then exhibits the non-detection, the structure judges that the disc is placed on the turntable 22, to thereby detect the completion of insertion of the disc and start the chucking means, resulting in completing the loading.

However, such conventional construction causes some disadvantages. More particularly, when any accident such as the insertion of a foreign article other than a disc into the structure, the lateral movement of a disc near the disc port 24, the drawing-out of a disc after slight insertion of the disc through the disc port 24 or the like which is sufficient to actuate the sensor occurs, the mode of the detection sensor is changed from the detection mode to the non-detection mode, to thereby cause the clamping means to uselessly carry out the disc clamping or chucking operation, resulting in the disc, the components of the structure and the like being damaged and/or failed.

Moreover, in the conventional disc transfer structure, the transfer roller 26 is constantly upwardly urged by means of a spring. Thus, in order to interposedly hold the disc between the transfer roller 26 and the support member 30 for the loading operation, it is required to downwardly force the transfer roller 26 to insert the disc between &he transfer roller and the support member and push the disc into a gap therebetween by force, so that a feeling of the operation may be deteriorated. In order to avoid the problem, it is desired that the rotation of the transfer roller 26 is started before the disc is inserted into the transfer roller and the support member, so that the loading is started at the time when the disc is inserted therebetween, to thereby improve the feeling. Unfortunately, if the structure fails to move the disc to a position where the disc is inserted between the transfer roller and the support member even when the transfer roller is thus rotated, the transfer roller continues to rotate while failing to engage the disc, resulting in a drive motor continuing to actuate. This causes excessive load to be applied to the motor, leading to damage to the motor and a failure in playing-back of the disc.

SUMMARY OF THE INVENTION

The present invention has been made in view of the foregoing disadvantages of the prior art.

Accordingly, it is an object of the present invention to provide a disc ejecting structure which is capable of positively ensuring the ejection of a disc from a disc player.

It is another object of the present invention to provide a disc ejecting structure which is capable of ejecting a disc from a disc player with safety and high reliability.

It is a further object of the present invention to provide a disc ejecting structure which is capable of positively detecting the position of a disc during a disc ejecting operation and/or the disc ejecting operation per se with high reliability.

It is still another object of the present invention to provide a disc ejecting structure which is capable of positively stopping a disc at an ejection competing position during a disc ejecting operation.

It is yet another object of the present invention to provide a disc ejecting structure which is capable of effectively preventing undesired reloading of a disc due to vibration, shock or the like accidentally applied to the disc.

It is even another object of the present invention to provide a disc ejecting structure which is capable of accurately discriminating two or more discs different in size to safely handle them with high reliability.

It is a still further object of the present invention to provide a disc ejecting structure which is capable of ensuring safe and positive insertion of a disc into the structure.

It is a yet further object of the present invention to provide a disc ejecting structure which is capable of effectively preventing a disc and the structure being damaged and/or failed due to a failure in insertion of the disc thereinto.

It is an even further object of the present invention to provide a disc ejecting structure which is capable of significantly improving the performance of the operation.

It is another object of the present invention to provide a disc ejecting structure which is capable of preventing useless operation of the structure.

In accordance with the present invention, there is provided a disc ejecting structure for a disc player which includes a housing, a turntable arranged at the center of the housing, a disc port provided on the front side of the housing, a transfer roller or means arranged between the turntable and the disc port so as to be rotatable in both directions, the transfer means rotating in one direction to transfer a disc to a position above the turntable during a disc loading operation and rotating in the other direction to transfer the disc from the position to an ejection completing position, a lifting means for vertically moving the disc between the position above the turntable and a disc setting position on the turntable, and a clamping means for clamping the disc placed on the turntable, and a drive means for driving the transfer means, lifting means and clamping means. The disc ejecting structure comprises an ejection completion detecting means for detecting the completion of ejection of the disc to stop the transfer means, the ejection completion detecting means comprising a plurality of disc detecting sensors arranged on the way of a transfer passage extending between the disc port and a position predetermined rearward of the transfer means in the housing and selectively exhibiting detection and non-detection modes which are combined to provide patterns, a processing means for judging depending upon the patterns whether the disc is in the course of ejection or at the ejection completing position, to thereby generate an ejecting operation detecting signal or an ejection completion detecting signal, and a control means connected to the processing means for carrying out starting, stopping or changing-over of the drive means depending upon the ejecting operation detecting signal or ejection completion detecting signal input thereto or a time at which said signal is input.

BRIEF DESCRIPTION OF THE DRAWINGS

These and other objects and many of the attendant advantages of he present invention will be readily appreciated as the same becomes better understood by reference to the following detailed description when considered in connection with the accompanying drawings in which like reference characters designate like or corresponding parts throughout; wherein.

DETAILED DESCRIPTION OF THE PREFERRED EMBODIMENTS

Now, a disc ejecting structure according to the present invention will be described hereinafter with reference to FIGS. 3 to 16.

FIGS. 3 to 6 illustrate an embodiment of a disc ejecting structure according to the present invention, which is constructed in a manner to be suitable for use for a mounted-type compact disc player which is accommodated to both of a 12 cm standard compact disc (hereinafter referred to as "12 cm disc") and a 8 cm standard compact disc (hereinafter referred to as "8 cm disc").

Figure 1:
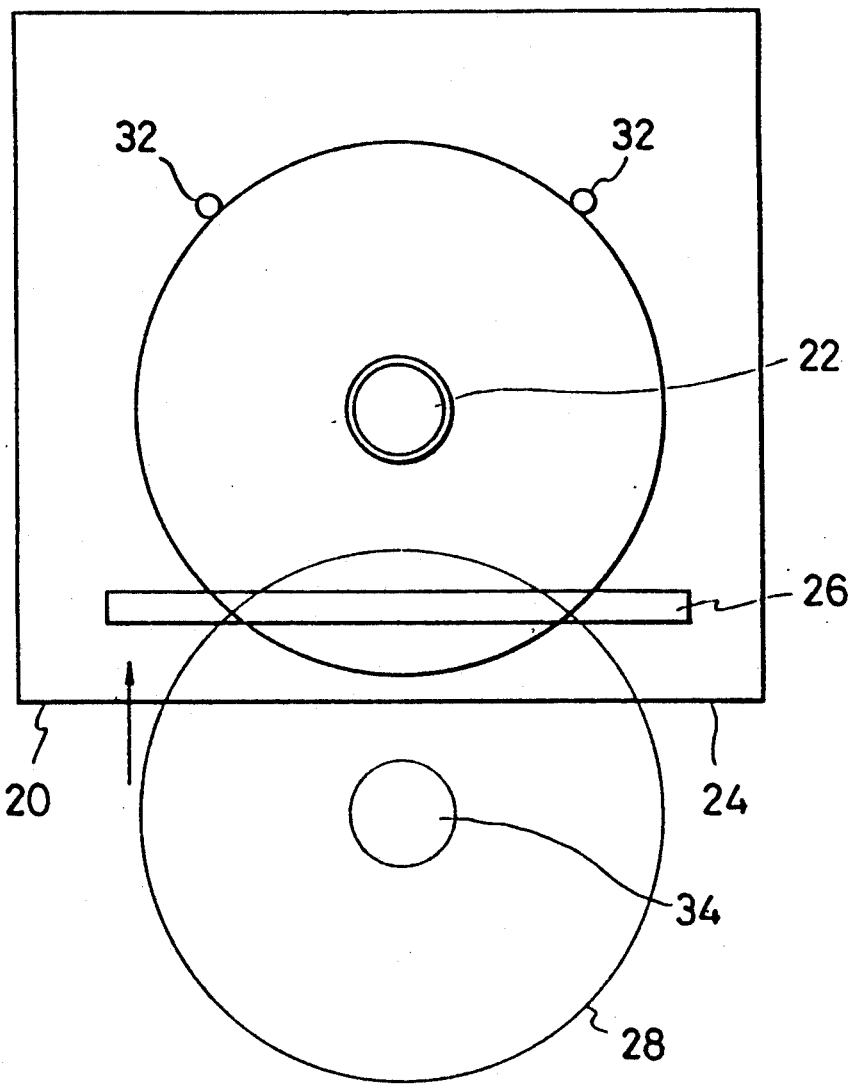
FIG. 1 is a schematic plan view showing a conventional disc ejecting or transfer structure.
Figure 2:
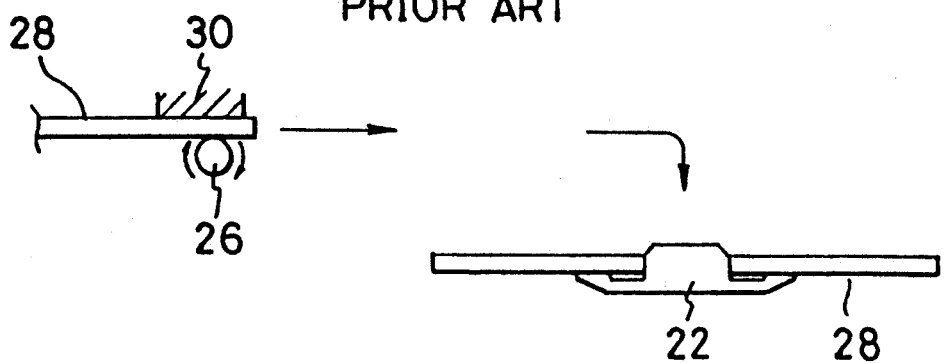
FIG. 2 is a schematic side elevation view showing a disc loading operation carried out by means of the disc transfer structure shown in FIG. 1.
Figure 3:
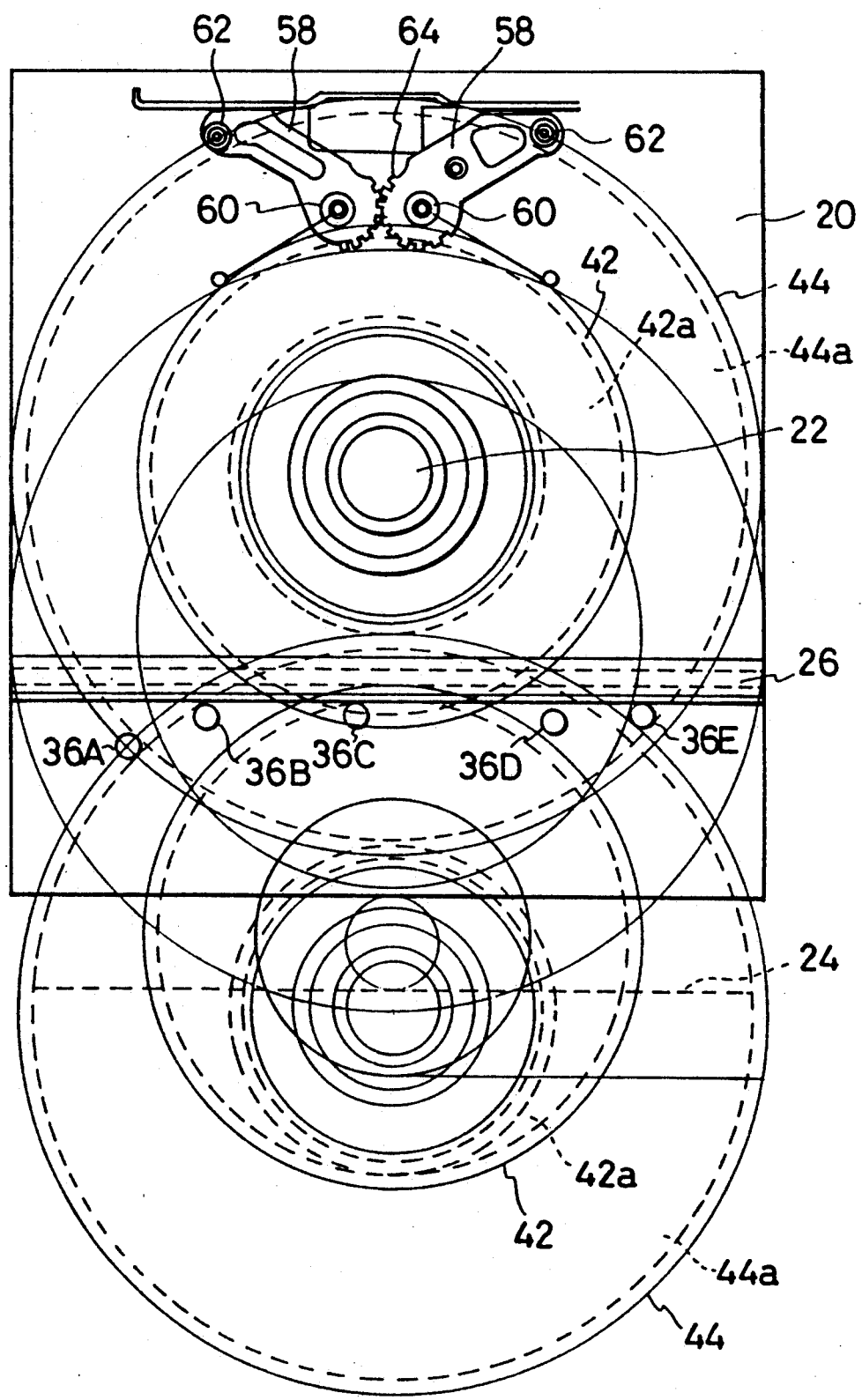
FIG. 3 is a plan view showing an embodiment of a disc ejecting structure according to the present invention.

A disc ejecting structure of the illustrated embodiment, as shown in FIG. 3, includes a disc detecting sensor group functioning as an ejection detecting means for detecting the ejection of a disc and comprising a plurality of disc detecting sensors arranged on a disc transport passage defined between a disc loading port 24 and a position predetermined rearward of a transfer means or roller 26 in a housing 20. In the illustrated embodiment, the sensor group comprises five disc detecting sensors which are arranged on the side of the transfer roller 26 facing the disc loading port 24 in a manner to be in proximity to the transfer or drive roller 26 and substantially in a row in the lateral direction of the housing 20. More particularly, the sensor group includes a first end sensor 36A and a second end sensor 36E constituting both ends of the group, a central center 36C constituting the center of the group, a first intermediate sensor 36B positioned between the first end sensor 36A and the central sensor 36C, and a second intermediate sensor 36D positioned between the second end sensor 36E and the central sensor 36C. For example, the first an d second end outermost sensors 36A and 36E may be so arranged that a distance therebetween is defined to be somewhat larger than the diameter of a 8 cm disc 42, and also the end sensor 36A is arranged so as to be spaced from a vertical line extending through the center of a turntable 22 by a distance larger than the distance between the second end sensor 36E and the vertical line, to thereby prevent the outer periphery of a 12 cm disc 44 from reaching the first end sensor 36A when the 12 cm disc is loaded on the turntable 22.

Figure 4:
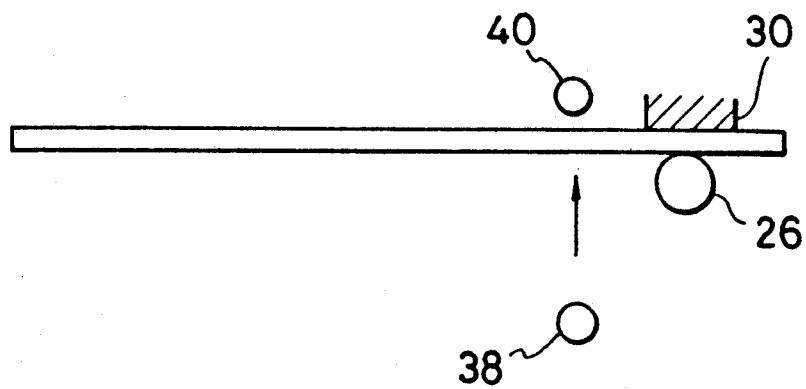
FIG. 4 is a schematic fragmentary side elevation view partly in section showing an essential part of the disc ejecting structure shown in FIG. 3.

The disc detecting sensors 36A to 36E, as shown in FIG. 4, each comprise a light emitting diode (LED) 38 and a light receptor 40 which are so arranged that light emitted from the diode 38 is received by the receptor 40 when no light-interceptor is interposed therebetween. The receptor detects this state as an open state, resulting in the sensor exhibiting or taking a non-detection mode. Whereas, when any light-interceptor is between the diode 38 and the receptor 40, light from the diode 38 fails to reach the receptor 40. The receptor 40 detects this state as a closed state, so that the sensor exhibits a detection mode. More specifically, when each of the sensors 36A to 36E overlaps the deposited portion 42a of the 8 cm disc 42 or the deposited section 44a of the 12 cm compact disc 44, the sensor is closed to exhibit a detection mode; whereas when a sensor each do not overlap the deposited section each of the discs or overlap only the outer peripheral portion of the disc outside the deposited section or the light-permeable inner peripheral portion of the disc, the sensor is open to exhibit or provide a non-detection mode.

In the illustrated embodiment, as shown in FIG. 3, an ejection completing position for the 12 cm disc 44 is defined to be a position at which the transfer roller 26 holds or catches the outer peripheral end of the 12 cm disc 44, whereas an ejection completing position for the 8 cm disc 42 is defined to be a position at which the disc is released from the transfer roller 26. The 12 cm disc has a large size, therefore, the ejection of the 12 cm disc to a position at which it is released from the transfer roller 26 causes it to possibly be damaged or fall when it is left as ejected. Thus, a position at which the transfer disc 26 remains holding the outer periphery of the 12 cm disc 44 is defined as the ejection completing position for 12 cm disc. This does not cause any problem when the 12 cm disc 44 is removed from the structure, because the removal is readily carried out irrespective of the disc being caught by the roller. Whereas, the ejection of the 8 cm disc to the position at which it is fully released from the roller 26 does not cause it to fall even when it is left ejected, because it has a small size. Also, the catching of the 8 cm disc by the transfer roller 26 renders removal of the disc from the structure somewhat troublesome, thus, the position at which it is released from the transfer roller 26 is defined as the ejection completing position for the 8 cm disc. However, the ejection completing position for the 8 cm disc may be defined to be the position at which it is slightly caught by the transfer roller 26.

Now, the arrangement of the sensors 36A to 36E with respect to each of the 8 cm disc 42 and 12 cm disc 44 will be described in detail hereinafter with reference to FIG. 3.

The central sensor 36C is arranged at a position somewhat deviated in the left direction in FIG. 3 from the vertical line extending through the center of the turntable 22, so that it may be closed by the deposited section 42a of the 8 cm disc 42 or the deposited section 44a of the 12 cm disc 44 when the disc 42 or 44 is placed at a carrying-in completing position above the turntable 22. Also, the central sensor 36C is rendered open by the light-permeable inner peripheral portion and the central hole of the disc when the disc 42 or 44 is in the course of ejection and then it is closed again until the disc reaches the ejection completing position.

The first intermediate sensor 36B and second intermediate sensor 36D are closed when the 12 cm disc 44 is at the carrying-in completing position above the turntable 22 and then constantly kept closed until the disc reaches the ejection completing position. Also, the intermediate sensors 36B and 36D are open when the 8 cm disc is at the carrying-in completing position above the turntable 22, closed when the disc is in the course of ejection, and then kept open again until it is transferred to the ejection completing position.

The first end sensor 36A is arranged in a manner to be spaced most from the vertical line extending through the center of the turntable 22, so that it is kept open when the 12 cm disc 44 is at the carrying-in completing position, closed immediately after the ejection of the disc is started, kept closed in the course of ejection and rendered open when the disc is transferred to the ejection completing position. The second end sensor 36E is so arranged that it is closed when the 12 cm disc is positioned above the turntable 22, kept closed in the course of ejection and rendered open prior to the first end sensor 36A when the disc is transferred to the ejection completing position. Also, the first and second end sensors 36A and 36B are arranged in such a manner that a distance therebetween is defined to be larger than the diameter of the 8 cm disc 42, resulting in being kept open throughout from the position at which the disc is placed above the turntable 22 to the ejection completing position.

To the disc detecting sensors 36A to 36E arranged as described above, as shown in FIG. 5, is connected a processing means 48. The processing means 48 functions to generate an ejecting-operation detecting signal when the disc is judged to be in the course of ejection by the processing means 48 within a predetermined set time depending upon a combination of the detection and non-detection modes exhibited by the sensors 36A to 36E after an ejection command is made and then generate an ejection-completing detecting signal when it judges within the predetermined set time that the disc is at the ejection completing position.

Also, the processing means 48 is connected through a control means 50 to a drive means 52. The control means 50 serves to control starting, stopping and changing-over of the drive means 52 and the drive means acts to drive the transfer roller 26, an elevating means 54 and a clamping means 56.

In FIG. 3, reference numeral 58 designates a pair of stopper arms each arranged in the housing 20 so as to be pivotally movable about a support shaft 60 on which one end thereof is supported. These stopper arms form stopping means at the back of the turntable. The stopper arms 58 each are provided on the other or free end thereof with a stopper pin 62. The other or free end of each of the stopper arms 58, when the 8 cm disc is inserted into the structure, is held at a stopper position for the 8 cm disc defined between the rear side of the housing 20 and the turntable 22 due to the action of a solenoid (not shown). When the 12 cm disc 44 is inserted therein, the free end of the stopper arm 58 is rendered pivotally movable about the support shaft 60 due to the release of action of the solenoid, so that the 12 cm disc forces the free end toward the rear side of housing 20. This results in the free end being pivotally moved to a stopper position for the 12 cm disc as shown in FIG. 3. Also, the stopper arms 58 are formed on the inner surfaces of the one ends thereof with gears 64 engaged with each other, respectively, through which both stopper arms are operatively connected, to thereby the moved in synchronism with each other.

Figure 5:
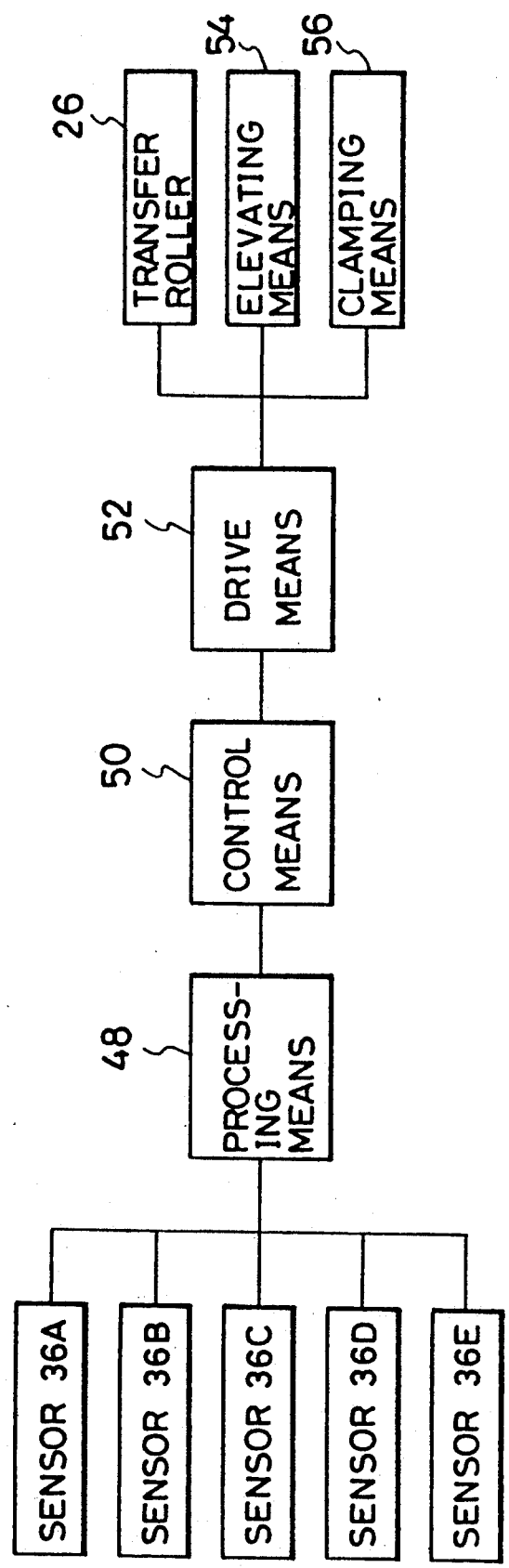
FIG. 5 is a block diagram showing a circuit construction employed in the disc ejecting structure shown in FIG. 3.
Figure 6A:
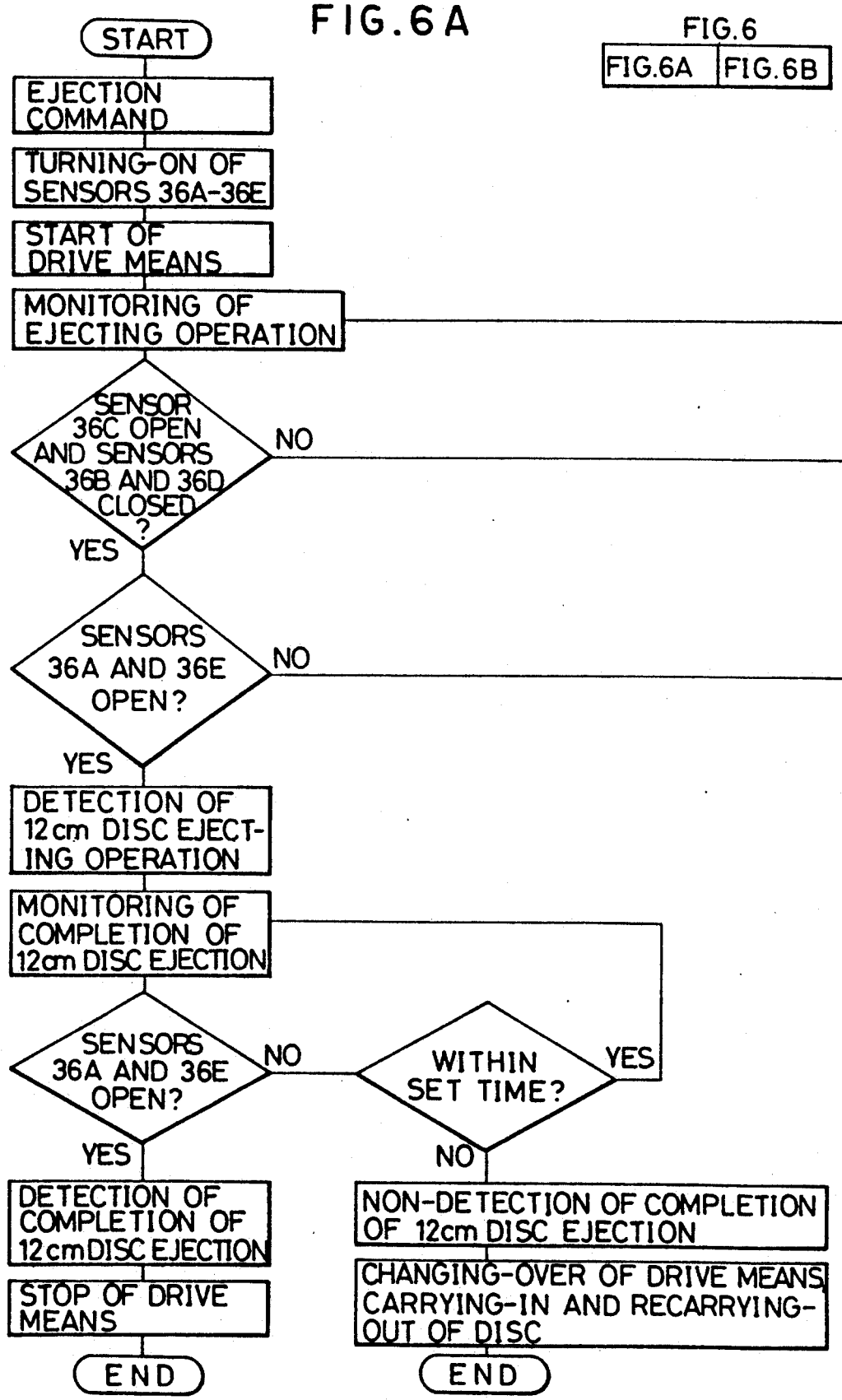
FIGS. 6A and 6B each are a flow chart showing the manner of operation of the disc ejecting structure shown in FIG. 3.
Figure 6B:
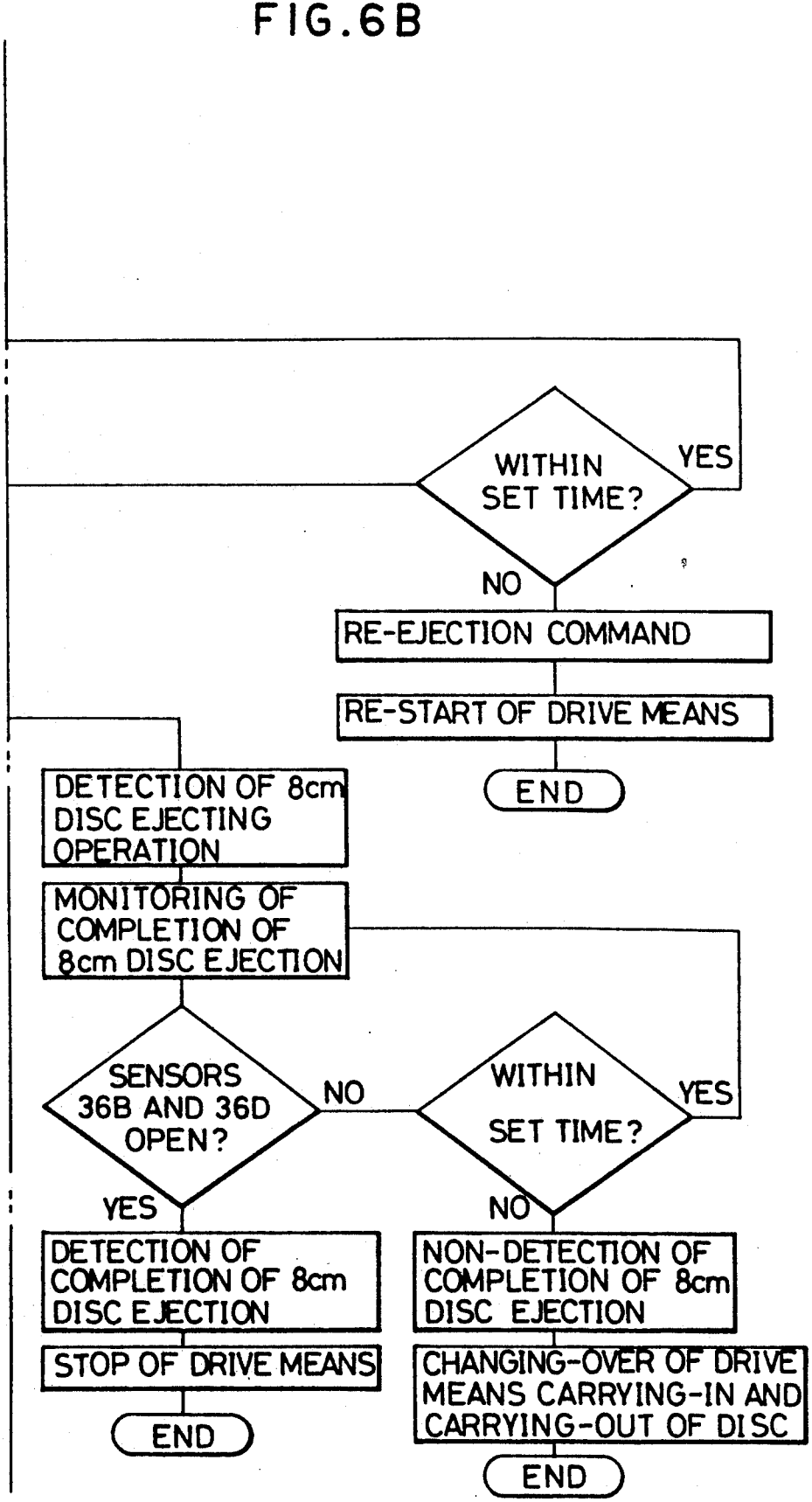

Now, the manner of operation of the disc ejecting structure of the illustrated embodiment described above will be described with reference to FIGS. 6A and 6B as well as FIGS. 3 to 5.

(1) Monitoring of Ejecting Operation

When a disc ejecting command is generated from the control means 50 while the 12 cm disc 44 or 8 cm disc 42 is clamped onto the turntable 22 for play-back, the drive means 52 starts to cause the releasing of the disc from the clamping means 56, the raising of the disc by the elevating means 54 and the rotation of the transfer roller 26 to be carried out in turn. Also, concurrent with the starting of the drive means 52 by the ejecting command, the disc detecting sensors 36A to 36E are turned on to initiate monitoring of the disc ejecting operation. The illustrated embodiment is promised on the assumption that the completion of ejection is not detected unless it is detected that the disc is in the course of ejection. The reason is that in the 12 cm disc 44 and 8 cm disc 42, it is difficult to discriminate patterns of combination of the detection mode and non-detection mode or opening and closing of the sensors at the disc play-back position and ejection completing position and there is a possibility that the completion of ejection is detected at the play-back position. More particularly, in the 8 cm disc, only the central sensor 36C is closed at both play-back position and ejecting position; whereas in the 12 cm disc 44, patterns of combination of the detection and non-detection or opening and closing of the sensors include a pattern wherein both first and second end sensors 36A and 36E are open as well as a pattern wherein only the first end sensor 36A is open, because the 12 cm disc 44 is kept afloat by means of a damper for the purpose of preventing vibration from being applied to the disc. The former pattern wherein both end sensors are open is the same as that obtained when the disc is at the ejection completing position.

(2) Detection of Disc Ejecting Operation

When opening of the central sensor 36C and closing of the first and second intermediate sensors 36B and 36D are carried out in the predetermined set time after the ejecting command is generated, resulting in a detection signal being generated while the disc ejecting operation is monitored; the processing means 48 judges that the disc is in the course of ejection, to thereby generate an ejecting operation detecting signal. In this instance, when the first and second sensors 36A and 36E each are closed to generate a detection signal as well, the processing means judges that a disc being handled is the 12 cm disc 44, which includes the 8 cm disc 42 having an adapter used therefor, to thereby generate a 12 cm disc ejecting operation detecting signal. Also, when the first and second end sensors 36A and 36E are open, it judges that a disc being handled is the 8 cm disc 42, so that a 8 cm disc ejecting operation detecting signal may be generated.

(3) Non-Detection of Disc Ejecting Operation

On the contrary, when opening of the central sensor 36C or closing of both first and second intermediate sensors 36B and 36D is not carried out even after a predetermined set time elapses, although the ejecting command is made to cause the sensors to be placed under the ejecting operation monitoring condition; the ejecting operation detecting signal is not generated from the processing means 48. In this instance, the control means 50 re-starts the drive means 52, so that the disc ejecting operation is carried out again which comprises the releasing of the disc from the clamping means 56, the raising of the disc by the elevating means 54 and the taking-out of the disc by rotation of the transfer roller 26.

(4) Detection of Completion of Ejection

When the processing means 48 generates the ejecting operation detecting signal and then judges that the patterns of combination of the detection mode and non-detection mode of the sensors indicate that the disc is at the ejection completing position, it generates an ejection completion detecting signal. More particularly, when the first and second end sensors 36A and 36E are open after the 12 cm disc ejecting operation detecting signal is generated, the processing means 48 judges that the 12 cm disc is att the ejection completing position, resulting in generating a 12 cm disc ejection completion detecting signal; whereas when the first and second intermediate sensors 36B and 36D are open after the 8 cm disc ejecting operation detecting signal is generated, it judges that the 8 cm disc is at the ejection completing position, to thereby generate a 8 cm disc ejection completion detecting signal. When the ejection completion detecting signal is generated, the control means 50 judges that the ejection has been fully carried out, to thereby stop the drive means 52.

In the illustrated embodiment, when only the first end sensor 36A or second end sensor 36E is open, the processing means 48 does not judge that the 12 cm disc is at the ejection completing position. Therefore, when the 8 cm disc having the adapter used therefor is to be ejected, light leaking through a gap between the adapter and the 8 cm disc effectively prevents the drive means 52 from being stopped in the course of ejection carried out when the end sensor 36A or 36E has been open.

(5) Non-Detection of Completion of Ejection

On the contrary, when the processing means 48 fails to judge that the patterns of combination of the detection mode and non-detection mode of the sensors indicate that the disc is at the ejection completing position, although the predetermined set time elapses after the ejecting operation detecting signal is generated; it does not generate the ejection completion detecting signal. In this instance, the control means 50 judges that any trouble occurs in the course of ejection, so that the drive means 52 may be changed over to rotate the transfer roller 26 in the opposite direction to accomplish the carrying-in of the disc. Thereafter, the drive means 52 i changed over again to reverse the transfer roller 26, resulting in the taking-out of the disc being carried out again. When the ejection is failed irrespective of repeating the operation several times in such disc re-ejecting operation, the drive means is stopped. Otherwise, the ejecting operation is repeated.

As described above, the illustrated embodiment is so constructed that the patterns of combination of the detection and non-detection modes by the five disc detecting sensors 36A to 36E detect the disc which is in the course of ejection or at the ejection completing position. Such construction effectively eliminates an error in detection or a failure in detection which is caused by the prior art. More particularly, the prior art, as described above, often erroneously judges that a disc which actually is at the play-back position is at the ejection completing position. On the contrary, the illustrated embodiment is not only adapted to detect a disc itself but constructed so that the completion of ejection of the disc is not detected unless the ejecting operation is detected, resulting in the completion of ejection being positively detected only when the disc actually reaches the ejection completing position. Also, the embodiment permits the completion of the ejection to be necessarily detected whenever the disc actually reaches the ejection completing position, to thereby positively prevent actuation of the drive means 52 from being uselessly repeated. Also, in the illustrated embodiment, when the completion of disc ejection is not detected, the ejecting operation can be repeated, to thereby permit the disc to be positively ejected. Thus, it will be noted that the disc ejecting structure of the illustrated embodiment significantly improves reliability of a disc player.

Figure 7:
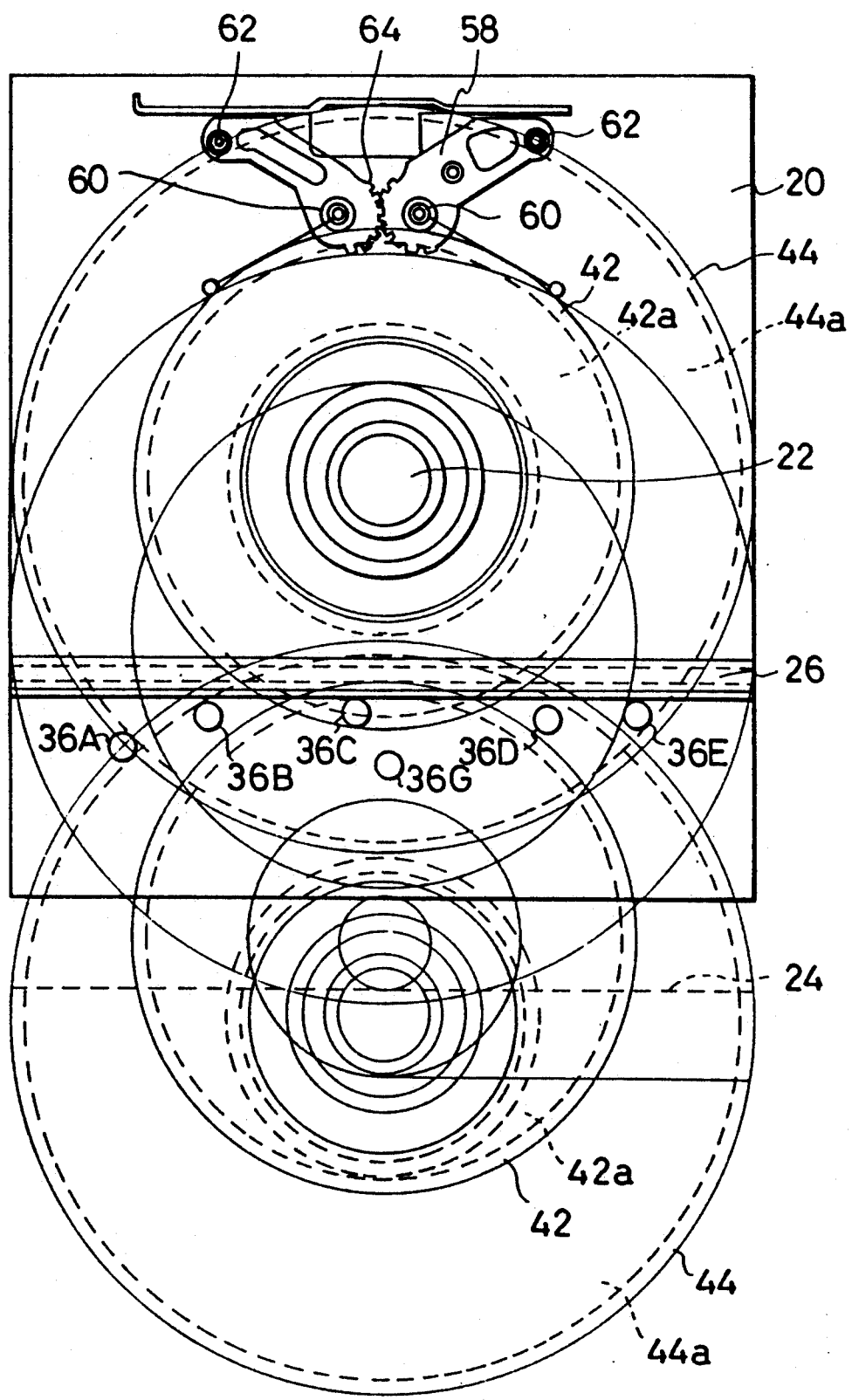
FIG. 7 is a plan view showing a modification of the disc ejecting structure shown in FIG. 3.

The present invention is not limited to the above-described embodiment. For example, the present invention may be constructed in such a manner as shown in FIG. 7. More particularly, a disc ejecting structure shown in FIG. 7 includes, in addition to five disc detecting sensors 36A to 36E as employed in the embodiment described above, a second central sensor 36G arranged forward of the central sensor 36C. Such construction permits patterns of combination of detection and non-detection modes of the sensors to be increased as compared with the above-described embodiment, so that the ejecting operation may be more effectively monitored.

Alternatively, the present invention may be constructed so as to detect only a disc which is in the course of ejection or at the ejection completing position. Such construction exhibits substantially the same advantages as in the embodiments described above.

The number of disc detecting sensors may be four or less. Alternatively, it may be seven or more. The arrangement of the sensors is not limited to the side of the transfer roller facing the disc port. They may be arranged on the side of the transfer roller facing the turntable. Also, the disc ejecting structure of the present invention is similarly applicable to a compact disc player for only a 12 cm disc or a 8 cm disc. In this instance, the disc ejecting structure may be simplified in construction. Further, the application of the present invention is not limited to a mounted-type compact disc player. It may be widely applicable to not on various type of compact disc players other than the mounted-type one but a laser disc player.

The illustrated embodiment may be constructed so as to positively stop the ejection completing position during the disc ejecting operation and effectively prevent reloading of the disc due to external force such as vibration, shock or the like accidentally applied to the disc as well as accomplish the foregoing advantages.

For this purpose, the first and second end or outermost sensors 36A and 36E are so arranged that a distance therebetween is defined to be somewhat larger than the diameter of the 8 cm disc, and also the end sensor 36A is arranged so as to be spaced form the vertical line extending through the center of the turntable 22 by a distance larger than the distance between the second end sensor and the vertical line, to thereby prevent the outer periphery of the 12 cm disc 44 from reaching the first end sensor 36A when the 12 cm disc is loaded on the turn table. Also, the embodiment, when the disc carrying-in operation is completed, is adapted to cause the chucking or clamping means (not shown) such as a chucking plate or the like to be started and a microswitch to detect the operation completing position of the chucking means, resulting in completing the disc loading operation. Between the disc port 24 and the transfer roller 26 is provided an escutcheon 66 which is formed into a flat shape so as to support a part of the compact disc thereon.

The manner of operation of the embodiment constructed as described above will be described hereinafter.

(1) Start of Ejection

In the embodiment constructed as described above, the chucking means operates in a disc release direction depending upon a signal from an ejection key to raise the disc and reverse the transfer roller 26, to thereby move the disc to the disc port 24.

(2) Completion of Ejection of 12 cm Disc

When the 12 cm disc is to be ejected, the second end sensor 36E first exhibits the non-detection mode, and then when the first end sensor 36A exhibits the non-detection mode, the ejection completing command is generated, so that the transfer roller 26 is stopped while somewhat holding the end of the disc, resulting in preventing the disc from falling due to vibration or the like.

Such slight engagement of the transfer roller with the 12 cm disc does not prevent removal of the disc from the structure because it has a large size.

Thus, in the embodiment, the first end sensor 36A detects the completion of ejection and the second end sensor detects the re-starting. Also, as described above, the ejection completing command is generated when the first end sensor exhibits the non-detection mode in a short period of time after the second end sensor 36E exhibits the non-detection mode. Accordingly, when only the first end sensor 36A at a more forward position exhibits the non-detection mode, the ejection completing command is not generated. This ensures that the transfer roller 26 continues to rotate until the ejection of the 8 cm disc of which the diameter is increased to 12 cm by attaching the adapter thereto is completed, even when light emitted from the light emitting diode 38 leaks through the gap between the adapter and the 8 cm compact disc, to thereby cause the first end sensor 36A to exhibit the non-detection mode.

(3) Judgment of Reloading of 12 cm Disc

When both end sensors exhibits the detection mode after the 12 cm disc ejecting operation is completed, a disc reloading command is generated. More particularly, when the first end sensor 36A which is adapted to detect the completion of ejection exhibits the non-detection mode during the ejecting operation, the disc 28 is stopped, resulting in the sensor 36A being positioned immediately outside the outer edge of the disc 28. Thus, if the reloading is carried out when only the end sensor 36A exhibits the detection mode, there is a possibility that the end sensor 36A exhibits the detection mode to lead to undesired loading of the disc when an operator accidentally touches the disc to move it during the disc removing operation. In the illustrated embodiment, the second end sensor 36E is arranged somewhat rearward of the first end sensor 36A, therefore, the reloading of the disc requires to push the disc into the housing 20 to a degree sufficient to cause the second end sensor 36E to exhibit the detection mode.

The 12 cm disc is held on the transfer roller 26, so that force of a predetermined level or more is required to push the disc into the housing. Thus, the embodiment effectively prevents the reloading of the disc even when the disc is forcedly pushed accidentally or by mistake during the disc taking-out operation.

(4) Judgment of Completion of Ejection of 8 cm Disc

The 8 cm disc has a size smaller than the 12 cm disc, so that the removal of the disc from the structure is troublesome as compared with the 12 cm disc. Also, there is substantially no possibility that it falls or is deformed even when it is left as ejected on the escutcheon 66. Thus, the ejection completing command is generated when the 8 cm compact disc is released from the transfer roller 26 to cause only the central sensor 36C to exhibit the detection mode and the remaining sensors to exhibit the non-detection mode.

(5) Judgment of Reloading of 8 cm Disc

When the disc is to be reloaded in the structure without being taken out through the escutcheon 66 after the ejection operation of the 8 cm disc is completed, it is forcedly pushed into the transfer roller 26. At this time, when the disc is pushed to the position at which the transfer roller 26 is engaged with the disc to cause a combination of the first end sensor 36A and first intermediate sensor 36B, that of the first end sensor 36A and second intermediate sensor 36D or that of he first intermediate sensor 36B and the second intermediate sensor 36D to exhibit the detection mode, the reloading command is generated, so that the transfer roller 26 may be rotated to carry out the reloading of the 8 cm disc.

Thus, the embodiment employs the disc reloading detecting means arranged so as to be delayed with respect to the ejection detecting means to detect the disc formed into the structure, to thereby selectively supply a disc reloading command to the transfer roller 26. The delay may be a positional delay or a time-delay. Such construction of the embodiment permits not only ejection of the disc to be positively completed but undesired reloading of the disc to be effectively prevented.

Figure 8:
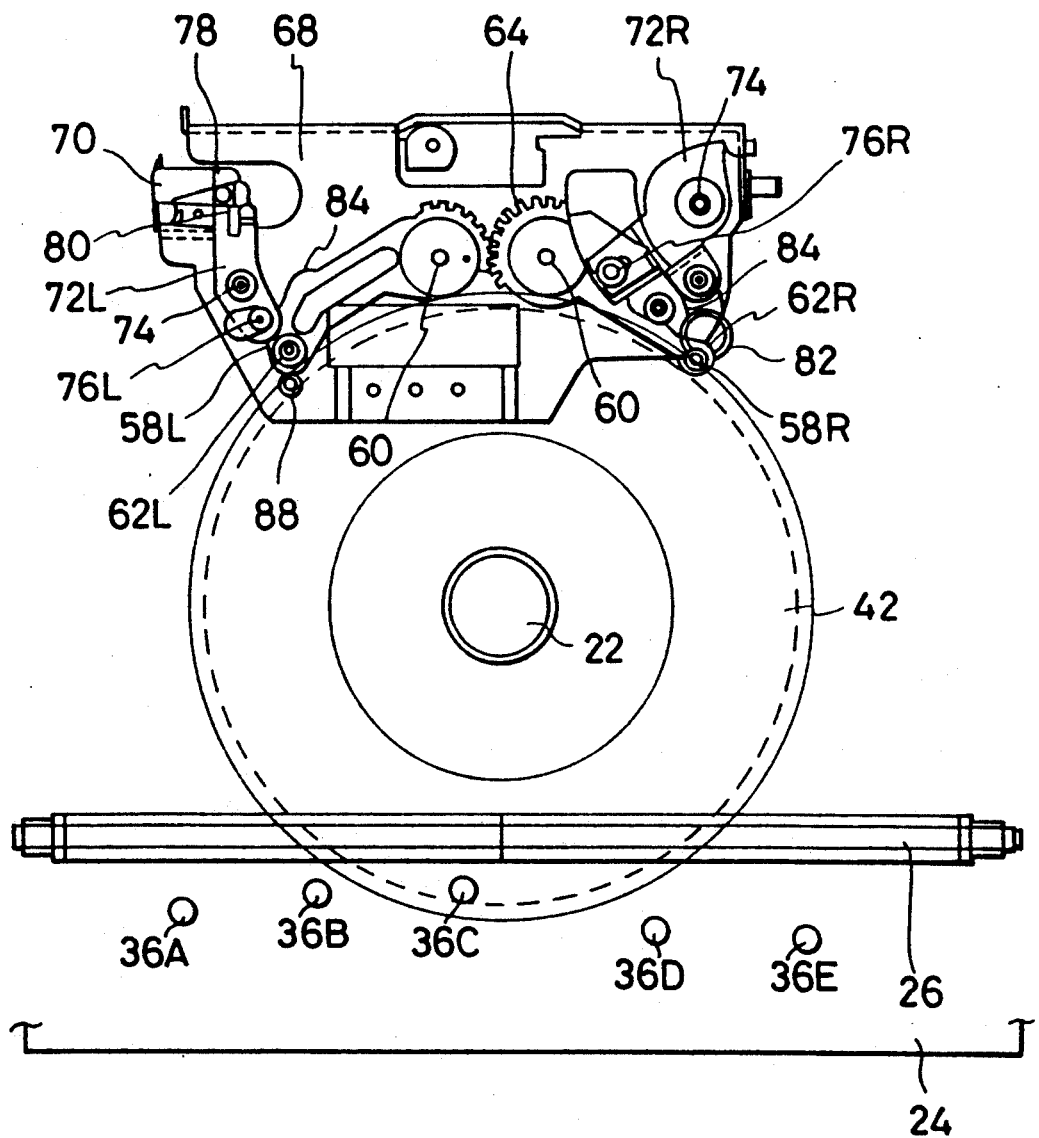
FIGS. 8 to 10 each are a plan view showing another embodiment of a disc ejecting structure according to the present invention.
Figure 9:
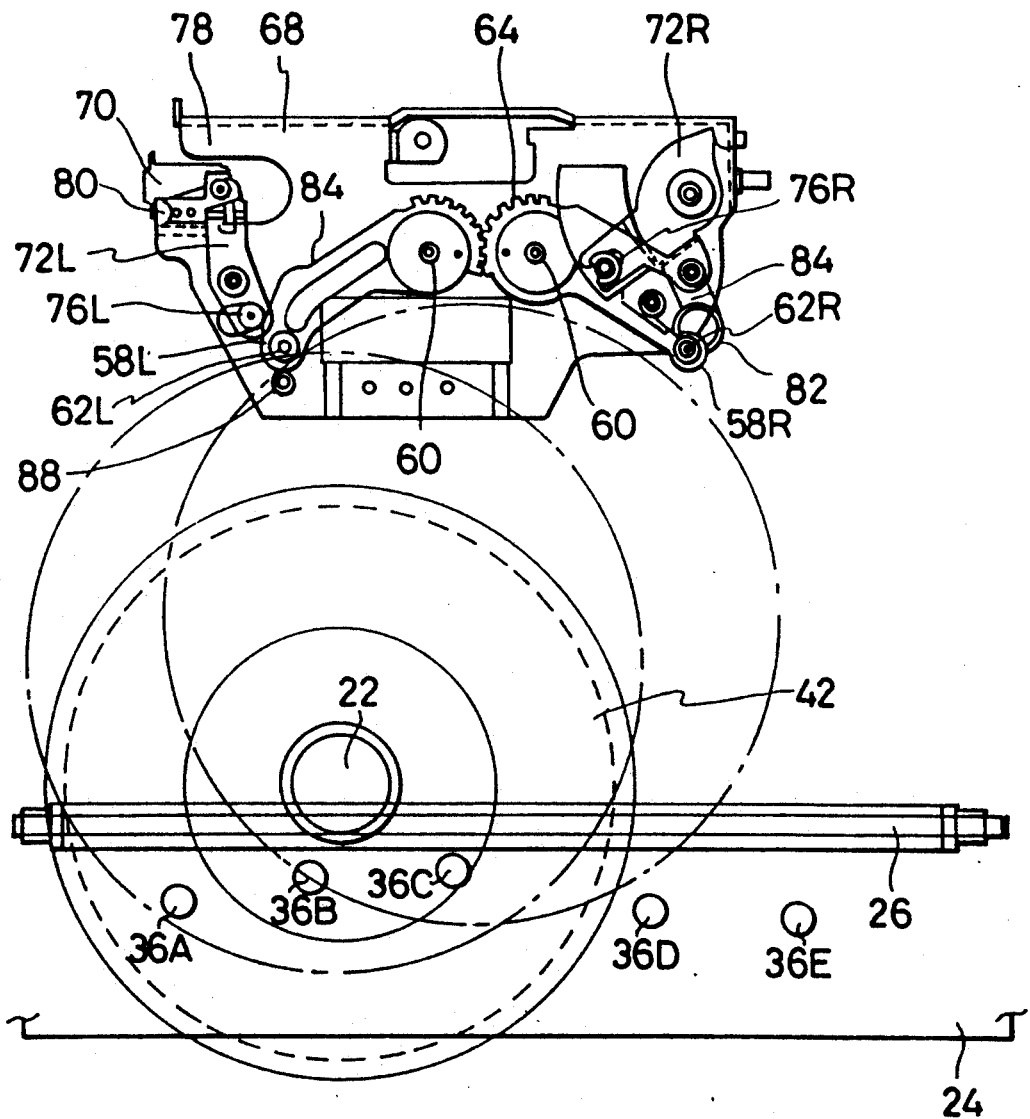
Figure 10:
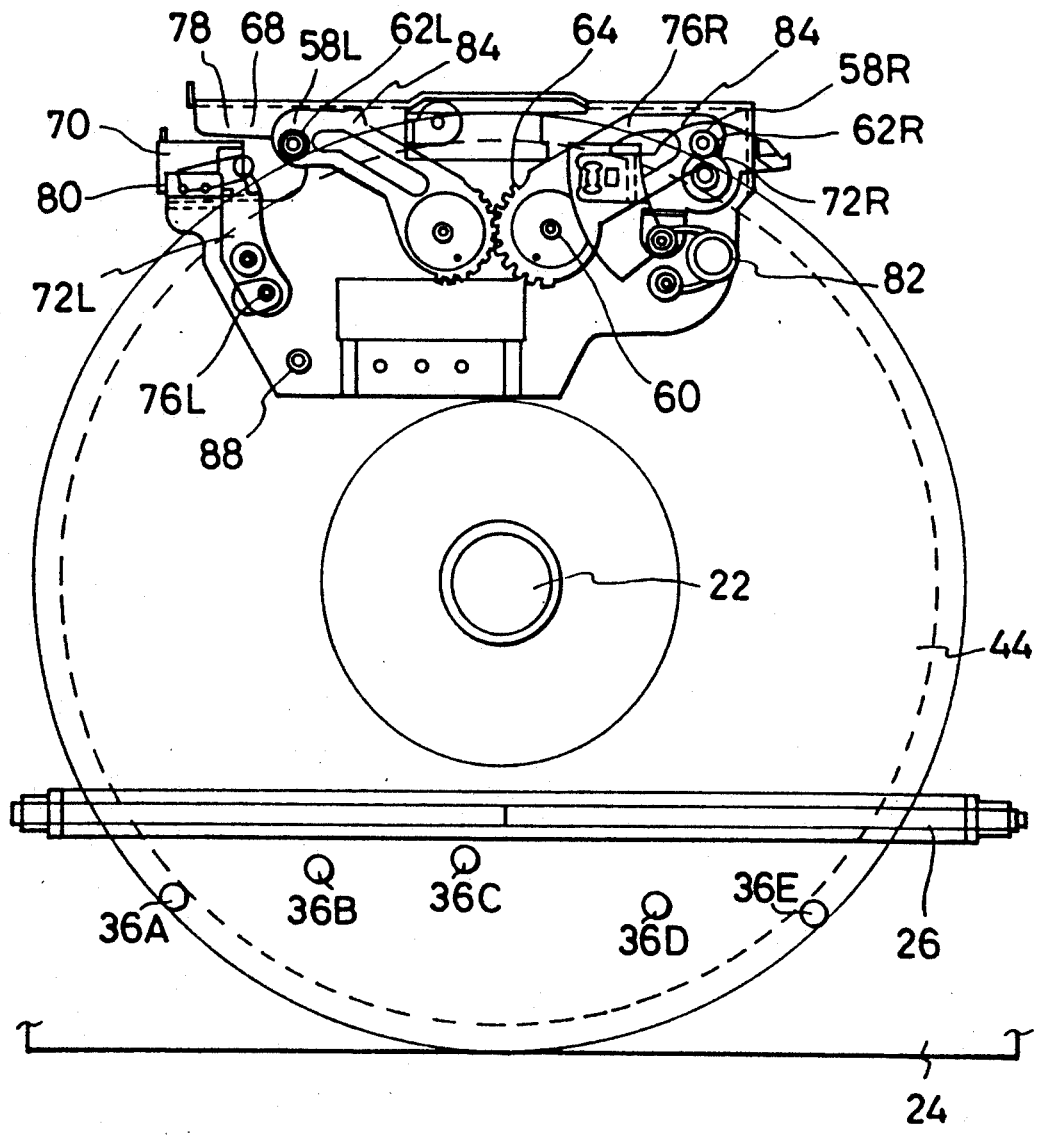

FIGS. 8 to 10 show another embodiment of a disc ejecting structure according to the present invention, which is adapted to accurately discriminate two or more discs different in size as well as accomplish the advantages of the above-described embodiment. A disc ejecting structure of the illustrated embodiment likewise includes an ejection detecting means, which comprises five disc detecting sensors, wherein first and second end sensors 36A and 36E are so arranged that a distance therebetween si defined to be somewhat larger than the diameter of a 8 cm disc 42, and also the end sensor 36A is arranged so as to be spaced from a vertical line extending through the center of a turntable 22 by a distance larger than the distance between the second end sensor 36E and the vertical line, to thereby prevent the outer periphery of a 12 cm disc 44 from reaching the first end sensor 36A when the 12 cm disc is loaded on the turn table.

The illustrated embodiment also includes a sub-housing 68 providing stopping means and arranged rearward of a transfer roller 26 and a turntable 22, which is provided with a solenoid 70 adapted to be operated by a 8 cm compact disc signal or a 12 cm compact disc signal generated from the sensors 36A to 36E. In the illustrated embodiment, the solenoid 70 is arranged on the left side of the rear portion of the sub-housing 68. Also, the sub-housing 68 is provided with a pair of stopper arms 58L and 58R, which are arranged opposite to each other in the lateral direction so as to serve as a disc holding means. The stopper arms 58L and 58R are formed on the portions of the proximal ends thereof opposite to each other with gears 64, through which they are operatively connected to or engaged with each other. Also, the stopper arms are adapted to be pivotally moved about support pins 60 symmetrically. The stopper arms 58L and 58R are provided at the distal ends thereof with stopper pins 62L and 62R, respectively,, which are adapted to be abutted against the outer periphery of the 8 cm disc 42 and that of the 12 cm disc 44 to position the discs, as shown in FIGS. 8 and 10.

Also, the structure of the illustrated embodiment includes a pair of pivotal movement regulating plates 72L and 72R which are arranged between the solenoid 70 and the stopper arm 58L and rearward of the stopper arm 58R so as to be pivotally movable about support shaft 74, respectively. The pivotal movement regulating plate 72L on the left side is provided at the distal end thereof with a pivotal movement regulating pin 76L, which is adapted to be abutted against the stopper arm 58L to regulate it to a forward operation position. The stopper arm 58R on the right side is provided at the intermediate portion thereof with a pivotal movement regulating pin 76R, which is engaged with the distal end of the pivotal movement regulating plate 72L to cause it to be pivotally moved in association with pivotal movement of the stopper arm 58R. The pivotal movement regulating plate 72L is connected to a movable element 78 of the solenoid 70 and forced in the counterclockwise direction by means of a spring 80. Thus, when the solenoid 70 is turned on, the pivotal movement regulating plate 72L is held at a pivotal movement regulating position in the counterclockwise direction as shown in FIG. 9 to regulate the stopper arm 58L to a first operation position shown in FIG. 8; whereas, when the solenoid 70 is turned off, the regulating plate 72L is rendered pivotally movable to permit the stopper arm 58L to be pivotally moved. The regulating plate 72R is engaged at one end thereof with one end of a reverse spring 82, of which the other end is connected to the sub-housing 68. The reverse spring 82, when the regulating plate 72R is at a position in the counterclockwise direction based on a substantially central position of tis pivotal stroke as shown in FIG. 9, serves to further force the plate in the counterclockwise direction and, when the regulating plate is at a position in the clockwise direction based on the substantially central position of the pivotal stroke as shown in FIG. 10, serves to further force it in the clockwise direction.

When the stopper arms 58L and 58R are pivotally moved in the rearward direction or in the upward direction in FIG. 8, they are prevented from being further pivotally moved because an abutment section 84 of each of the stopper arms which is provided on the rear side of the arm is abutted against the sub-housing 68 to cause each stopper arm to be regulated to a second operation position as shown in FIG. 10. Also, the stopper arm 58L, as shown in FIG. 9, is forwardly regulated to the first operation position and prevented from being further pivotally moved in the forward direction from the first operation position by an arm stopper pin 88 fixed on the sub-housing 68.

Also, the illustrated embodiment, when a disc carrying-in operation is completed, is adapted to cause a chucking or clamping means (not shown) such as a chucking plate or the like to be started and a micro-switch to detect an operation completing position of the chucking means, resulting in completing a disc loading operation.

Figure 11:
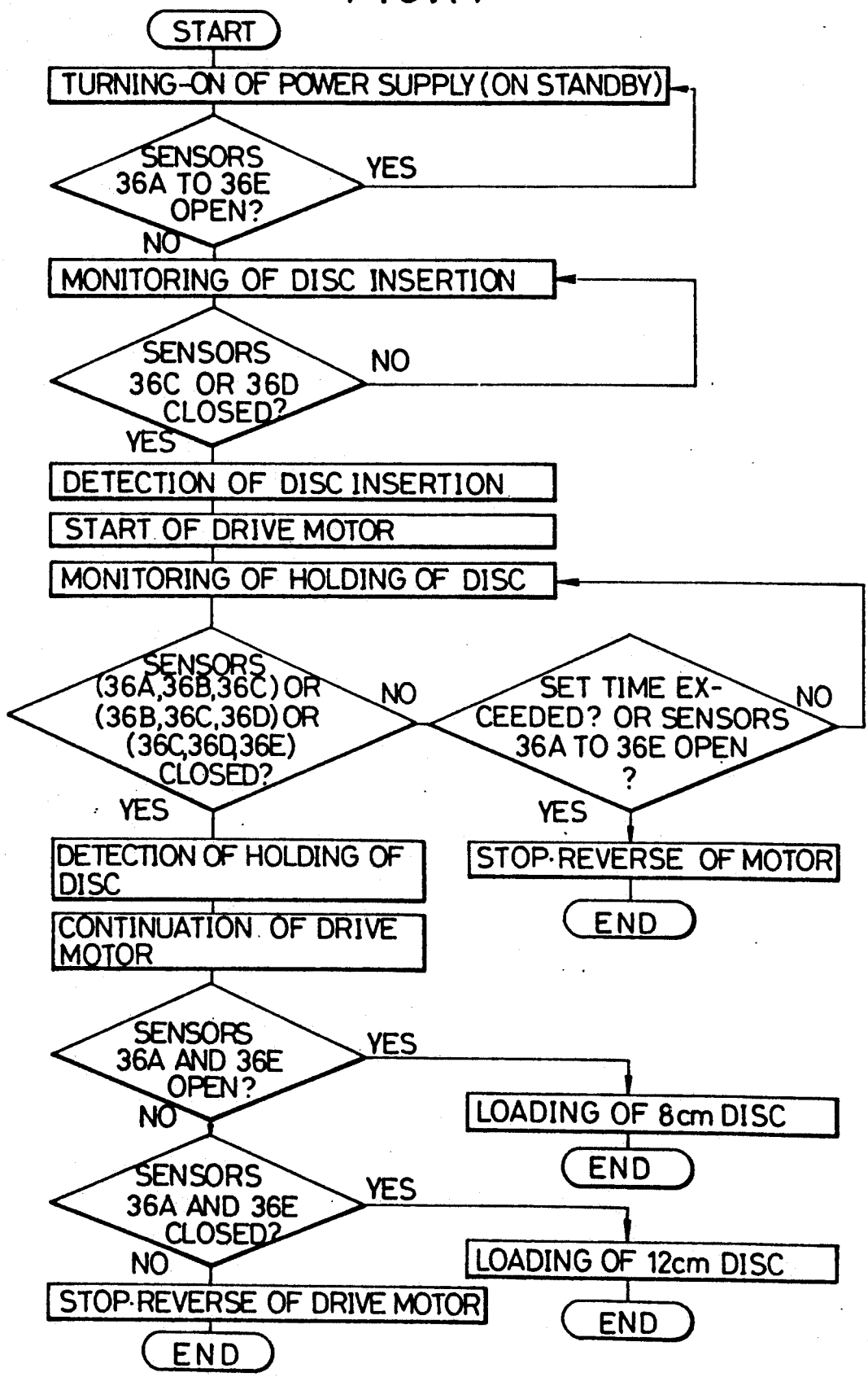
FIG. 11 is a flow chart showing the manner of operation of the disc ejecting structure shown in FIGS. 8 to 10.

Now, the manner of operation of the illustrated embodiment will be described hereinafter with reference to FIG. 11. In FIG. 11, the words "open" and "closed" mean a non-detection mode of the sensor and its detection mode as in the preceding description, respectively.

(1) Start of Loading

When the sensors 36A to 36E each exhibit a non-detection mode at the time of turning-on of a power supply, it is judged that no compact disc is at a disc port. Thus, the structure is ready for loading of a disc. On the contrary, when the loading is already completed at the time of turning-on of the power supply, the structure is ready for a subsequent key operation or a loaded disc is ready for play-back.

When at least one of the central sensor 36C and intermediate sensor 36D detects the insertion of a disc to exhibit a detection mode, a loading signal is supplied to a loading motor, so that the transfer roller 26 is rotated to draw the disc into the structure. When all the sensors exhibit the non-detection ode, it is judged that a disc left stand has been taken out, so that the structure is ready for loading.

(2) Confirmation of Engagement between Transfer Roller and Compact Disc

Subsequent to the loading signal or command, a combination of three sensors 36A, 36B and 36C; 36B, 36C and 36D; or 36C, 36D and 36E exhibits the detection mode, the generation of the loading signal is continued.

(3) Removal of Foreign Article

However, when any combination of the sensors other than the above-described combination takes the detection mode or a predetermined period of time (for example, 0.5 second) elapses, it is judged that any foreign article other than a compact disc is inserted, so that the supply of the loading signal is stopped to stop the rotation of the transfer roller 26. Also, when all the sensors exhibit the non-detection mode in the course of loading for other reasons, it is judged that a foreign article has been inserted. This results in an ejection signal being generated to reverse the transfer roller 26 to discharge the inserted foreign article.

(4) Judgment of 8 cm Disc

When the first and second end sensors 36A and 36E concurrently exhibit the non-detection mode during the loading operation, the structure judges that the disc which has been inserted is a 8 cm disc 42 and supplies a 8 cm disc signal to the solenoid 70, so that it turned on. The inserted 8 cm disc 42 is selectively abutted against the stopper pins 62L and 62R depending upon a position of insertion of the disc. More particularly, as shown in FIG. 9, when it is inserted from the lift side, it is abutted against the left stopper pin 62L; whereas when it is inserted from the right side, it is abutted against the right stopper pin 62R. This results in the stopper pin 62L or 62R abutted against, the disc 42 being rearward forced. At this time, the solenoid 70 has been already turned on, therefore, the pivotal movement regulating plate 72L on the left side which is provided with the movable element 78 is held at the pivotal movement regulating position as shown in FIG. 9, so that the stopper arm 58L on the left side is regulated to the first operation position. This causes the right stopper arm 58R, which is operatively connected through the gears 64 to the left stopper arm 58L, to be prevented from being pivotally moved through the engagement between the gears 64, resulting in being likewise regulated to the first operation position.

(5) Judgment of 12 cm Disc

When the first and second end sensors 36A and 36E concurrently exhibit the detection mode during the loading operation, the structure judges that the disc which has been inserted is a 12 cm disc 44. At this time, the sensor group supplies a 12 cm disc signal to the solenoid 70, resulting in the solenoid being turned off. The inserted 12 cm disc 44, as shown in FIG. 10, is abutted against the stopper pin 62L or 62R to rearward force them. At this time, the solenoid 70 is kept turned off, therefore, the pivotal movement regulating plate 72L on the left side on which the movable element 78 is mounted is kept movable, so that the left stopper arm 58L and right stopper arm 58R operatively connected to the arm 58L may be kept pivotally movable.

More particularly, at the time when the 12 cm disc 44 is abutted against the stopper pin 62L or 62R, both stopper arms 58L and 58R are kept movable, so that the 12 cm disc 44 forces the stopper arms in the rearward or loading direction. The left pivotal movement regulating plate 72L, during the first half of operation of the left stopper arm 58L, is kept engaged with the stopper arm 58L, to thereby be forced against it, resulting in being pivotally moved against the spring 80 in the clockwise direction. During the second half of the operation, it is disengaged from the stopper arm 58L, to thereby returned to the original in the counterclockwise direction due to the action of the spring 80 as shown in FIG. 10. The pivotal movement regulating plate 72R on the right side, during the first half of operation of the right stopper arm 58R, is kept engaged with the stopper arm 58R, so that it is forced against the stopper arm 58R. Thus, the plate 72R is pivotally moved in the clockwise direction against the reverse spring 82. After the spring 32 reverses, the reversing force of the spring causes the rotation of the plate 72R in the clockwise direction to be continued. The 12 cm disc 44 which is inserted into the structure while forcing the stopper arms 58L and 58R is then stopped when the abutment section 84 of each of the stopper arms is abutted against the surface of the sub-housing 68 and thereafter placed on the turntable 22.

(6) Judgment of Disc of 12 cm Diameter and 8 cm Deposition Diameter

In view of a compact disc player which fails to be accommodated to a 8 cm compact disc, there is manufactured and sold a compact disc which is 12 cm in diameter and 8 cm in deposition diameter. When the compact disc of this type is inserted into the disc ejecting structure of the illustrated embodiment, the first and second end sensors 36A and 36E fail to exhibit the detection mode because the outer periphery of the disc is light-permeable, so that the stopper arms 58L and 58R are held at the 8 cm disc position. This causes the disc to be stopped due to the abutment against the stopper pins 62 prior to the completion of the insertion, irrespective of actually having a diameter of 12 cm. At this time, the central sensor 36C and intermediate sensors 36B and 36D detect the 8 cm deposition section, resulting in exhibiting the detection mode. Actually, the central sensor is not considered in view of the fact that the central portion of the disc is light-permeable. When this is continued over a predetermined period of time, the absorption by the solenoid 70 is released, so that the disc 44 rearward forces the stopper arms 58L and 58R from the first operation position to the second operation position.

The remaining part of the embodiment may be constructed in substantially the same manner as the above-described embodiment.

Figure 12:
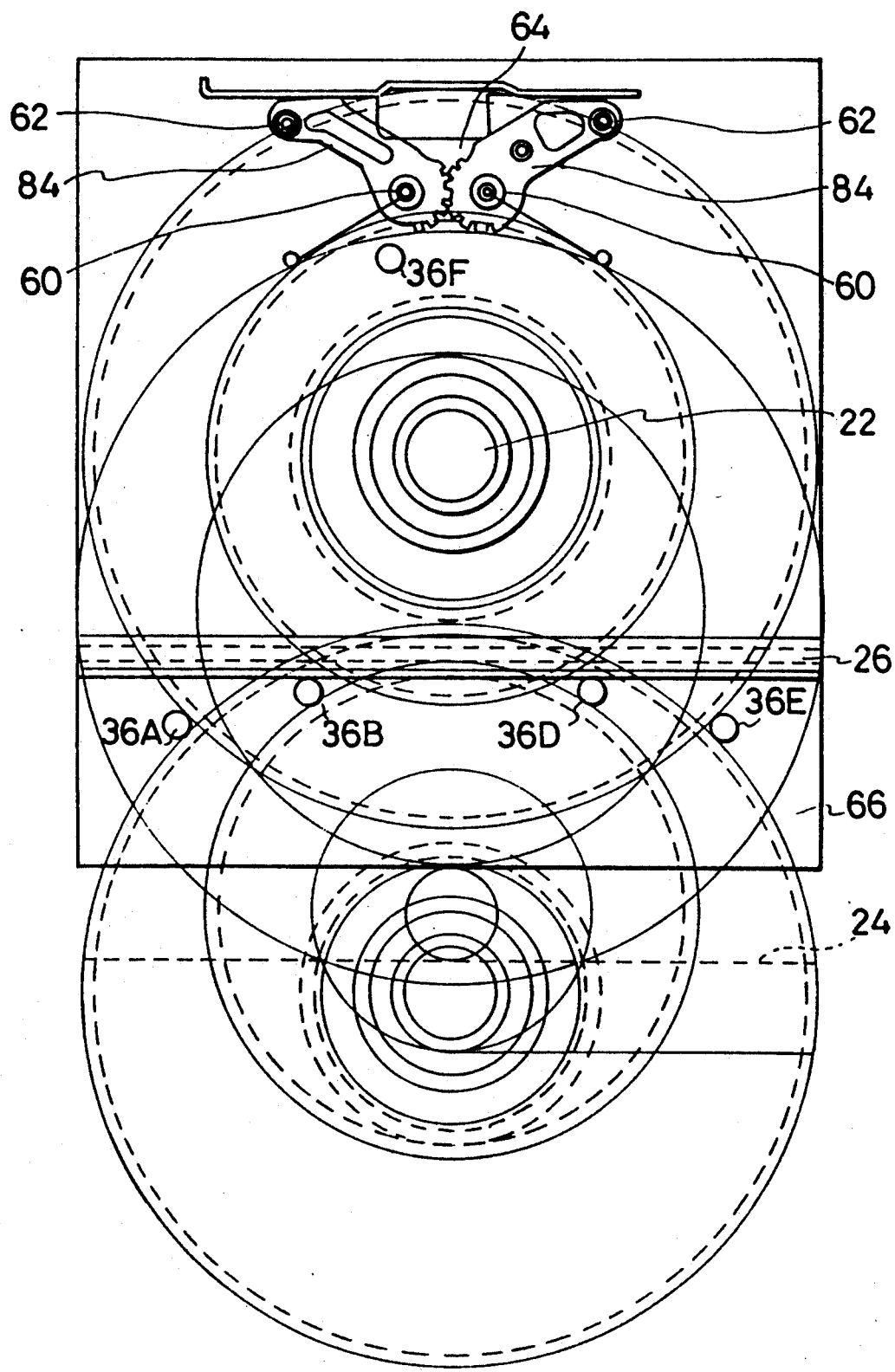
FIG. 12 is a plan view showing a modification of the disc ejecting structure shown in FIGS. 8 to 10.

FIG. 12 shows a modification of the embodiment described above with reference to FIGS. 8 to 10. In the modification, four front sensors are arranged in front of a transfer roller 26 and one rear sensor is arranged rearward of the roller 26.

The front sensors comprises two end or outer sensors 36A and 36E and two intermediate or inner sensors 36B and 36D, which so are arranged that the outer sensors 36A and 36E ar laterally spaced by a distance of 12 cm or less from each other and the inner sensors 36B and 36D are laterally spaced by a distance of 8 cm or less from each other. The rear sensor is designated by reference character 36F and arranged in such a manner that when a 8 cm disc 42 is placed on a turntable 22, it is positioned inside the outer periphery of the disc. The disc detecting sensors 36A to 36E exhibit the same detection and non-detection mode as those of the embodiment shown in FIGS. 8 to 10.

Now, the manner of operation of the modification will be described hereinafter.

(1) Judgment of 8 cm Disc

The structure judges that a disc which has been inserted is a 8 cm disc when both the inner sensors 36B and 36D concurrently exhibit the detection mode, to thereby supply a 8 cm disc signal to a solenoid. The subsequent operation is carried out in the same manner as the above-described embodiment.

The inner sensors 36B and 36D are arranged rearward as compared with the outer sensors 36A and 36E; therefore, in order that both inner sensors 36B and 36D exhibit the detection mode, it is required that the outer periphery of the 8 cm disc must be somewhat engaged with the transfer roller 26. This permits the loading to be positively carried out without causing a disadvantage that the transfer roller 26 continues useless rotation while the disc is left stand at a disc port 24. Also, the inner sensors 36B and 36D functioning to start the loading are arranged in a manner to positionally correspond to the center of the disc port 24 or its vicinity. Such arrangement effectively prevents the specular surface of the disc from being damaged due to its sliding on the transfer roller 26, because it is not required to slide the disc in the direction of center of the turntable 22 when it is inserted into the structure.

(2) Judgment of 12 cm Disc

The structure judges that the disc which has been inserted is a 12 cm disc when all the sensors 36A to 36F simultaneously exhibit the detection mode. At this time, the solenoid 70 is turned off. The subsequent operation may be carried out in the same manner as the above-described embodiment.

Thus, it will be noted that the embodiment shown in FIGS. 8 to 12 accurately discriminates two or more discs different in size by only the arrangement of the sensors exhibiting the detection or non-detection mode in a simple manner.

Figure 13:
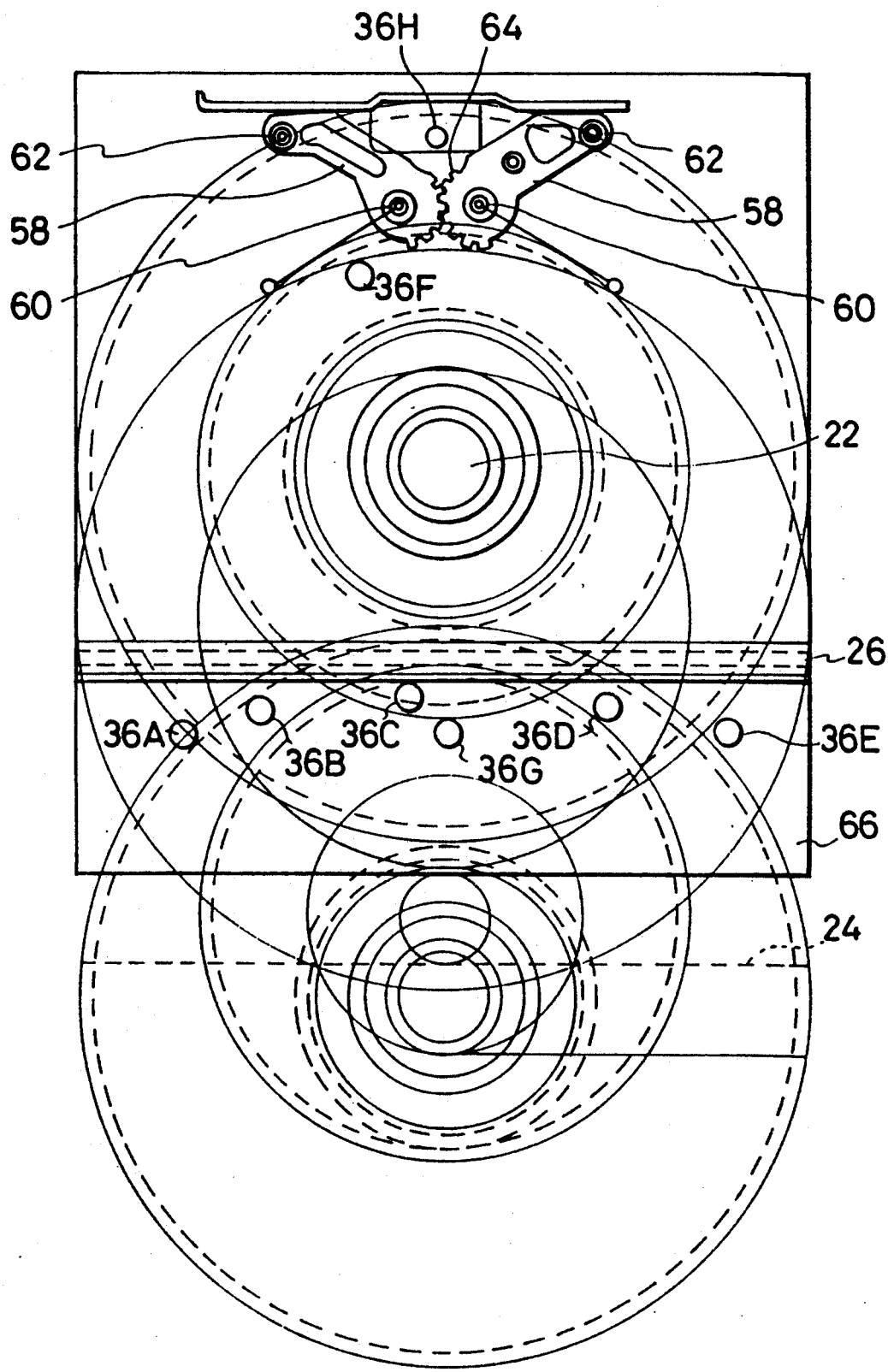
FIG. 13 is plan view showing a further embodiment of a disc ejecting structure according to the present invention.

FIG. 13 shows a further embodiment of a disc ejecting structure according to the present invention, which is adapted to not only exhibit the advantages of the embodiment shown in FIG. 3 but ensure positive and safe handling of a disc in the housing. A disc ejecting structure of the illustrated embodiment includes, in addition to five sensors 36A to 36E arranged forward of a transfer roller 26 as in the above-described embodiment, three sensors 36F to 36H arranged forward and rearward of the transfer roller 26. The sensor 36G is arranged forward of the central sensor 36C and the sensors 36F and 36H are arranged rearward of the roller 26. More particularly, the first and second end sensors 36A and 36E are arranged so as to be spaced by a distance somewhat larger than 8 cm from each other in the lateral direction of the structure and be away from the outer periphery of a 12 cm disc when it is set on a turntable 22. A distance between the intermediate sensors 36B and 36D is set to be smaller than 8 cm. The central sensor 36C is arranged so as to be positioned inside the outer periphery of a 8 cm disc when it is set on the turntable 22.

The sensor 36G is arranged so as to be positioned outside the 8 cm disc when it is set on the turntable. The sensors 36F and 36L arranged rearward of the transfer roller 26 are, as shown in FIG. 13, so positioned that the sensor 36F is inside the outer periphery of the 8 cm disc when it is placed on the turntable 22 and the sensor 36H is inside the outer periphery of the 12 cm disc when it is placed on the turntable 22.

The remaining part of the illustrated embodiment may be constructed in substantially the same manner as the embodiment shown in FIG. 3 or FIGS. 8 to 10.

Now, the manner of operation of the above-described embodiment will be described hereinafter.

(1) Start of Loading of Disc

When the foremost sensor 36G detects a disc inserted after a power supply is turned on, to thereby exhibit the detection mode, a disc loading command is generated to cause the transfer roller 26 to draw the disc into the structure. At this time, a size of the disc inserted may be discriminated depending upon patterns of combination of detection modes of the sensors 36A to 36E, as in the embodiment described above in connection with FIGS. 8 to 10.

(2) Completion of Insertion of 8 cm Disc

During loading of the 8 cm disc 42, when the central sensor 36C and sensor 36F exhibit the detection mode and the sensors 36A, 36B, 36D, 36E and 36K each exhibit the non-detection mode while the disc 42 is abutted against stopper pins 62 of stopper arms 58 regulated to a first operation position or 8 cm disc position, the structure detects that the insertion of the 8 cm disc is completed.

If the 8 cm disc is moved in the lateral direction at a disc port 24 or drawn out when it is to be inserted into the structure, it is considered that only the central sensor 36C exhibits the detection mode. Also, when the matter inserted into the structure is a foreign article other than a proper disc, it is considered that only the central sensor likewise exhibits the detection mode. Thus, when only the central sensor 36C is used for detecting the completion of insertion of the 8 cm disc, there is a possibility that the structure carries out malfunction.

However, in the illustrated embodiment, the completion of insertion of the 8 cm disc is detected only when both central sensor 36C and rear sensor 36F exhibit the detection mode. Thus, the embodiment effectively prevents a chucking or clamping means from starting even if only the central sensor 36C erroneously takes the detection mode, resulting in the completion of insertion of the 8 cm disc being carried out only when it is accurately placed at a predetermined position on the turntable 22.

(3) Completion of Insertion of 12 cm Disc

During loading of the 12 cm disc, if the rearmost sensor 36H exhibits the detection mode, the end sensors 36A and 36E exhibit the non-detection mode and the sensors 36B, 36C, 36D and 36K takes the detection mode when the rearmost sensor 36H exhibits the detection mode while it is abutted against the stopper pins 62 regulated to a second operation position or 12 cm disc position; the completion of insertion of the disc is detected.

If the structure of the prior art is so set that the completion of insertion of the 12 cm disc is detected when only the rearmost sensor 36H exhibits the detection mode, a chucking means possibly carries out malfunction. Also, even when the prior art is so set that the detection of completion of the insertion takes place on the assumption that both end sensors 36A and 36E take the non-detection mode, there is a possibility that the chucking means carries out malfunction when a foreign article other than the disc is inserted or the disc is erroneously or accidentally moved. On the contrary, in the illustrated embodiment, as described above, the detection of completion of the insertion is accomplished only when the end sensors 36A and 36E exhibit the non-detection mode and the rearmost sensor exhibits the detection mode.

Thus, in the illustrated embodiment, the insertion completion detecting means comprises the first sensor group and second sensor respectively arranged inside and outside the outer periphery of the disc set on the turntable, and the insertion detection is detected when the first sensor group exhibits the detection mode and the second sensor group takes the non-detection mode. Thus, the first and second sensor groups are variable therebetween depending upon the size of the disc.

Figure 14:
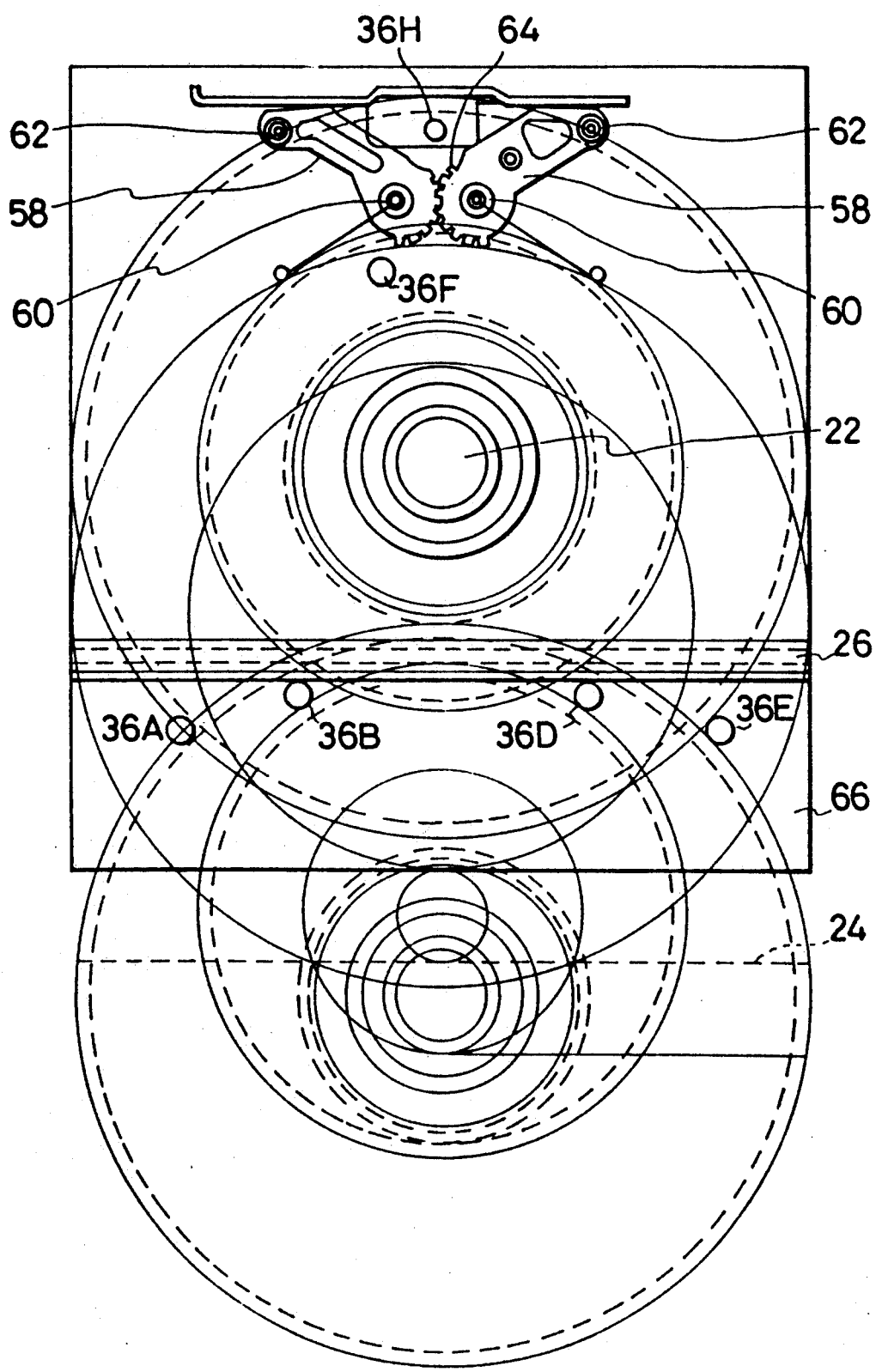
FIG. 14 is a plan view showing a modification of the disc ejecting structure shown in FIG. 13.

FIG. 14 shows a modification of the embodiment described above with reference to FIG. 13. A disc ejecting structure of the modification includes four sensors 36A, 36B, 36D and 36E arranged forward of a transfer roller 26 and two sensors 36F and 36H arranged rearward of the transfer roller 26. The end or outer sensors 36A and 36E are arranged so as to be laterally spaced from each other by a distance of 12 cm or less, so that they take the non-detection mode when the insertion of a 12 cm disc into the structure is completed. The two intermediate or inner sensors 36B and 36D are provided in proximity to a transfer roller 26 and in a manner to be laterally spaced from each other by a distance of 8 cm or less. Also, the sensors 36B and 36D are arranged at positions where they exhibit the non-detection mode when the insertion of a 8 cm disc is completed. The rear sensor 36F is positioned so as to be inside the outer periphery of the 8 cm disc when it is set on a turntable 22, and the completion of insertion of the 8 cm disc is detected when it takes the detection mode. The rearmost sensor 36H is provided so as to be inside the outer periphery of the 12 cm disc when it is set on the turntable 22 and the completion of insertion of the 12 cm disc is detected when it takes the detection mode.

The remaining part of the modification may be constructed in substantially the same manner as the embodiment of FIG. 13.

Now, the manner of operation of the modification will be described hereinafter.

When both inner sensors 36B and 36D simultaneously exhibit the detection mode, a disc loading command is supplied to the transfer roller 26, so that the transfer roller 26 is rotated to draw an inserted disc into the structure. When any one of the four front sensors 36A to 36E takes the detection mode, the supply of the loading command is continued.

When the rear sensor 36F exhibits the detection mode and all the front sensors 36A to 36E take the non-detection mode, the inserted disc is judged to be a 8 cm disc and the insertion of the disc is completed.

When the rearmost sensor 36H exhibits the detection mode, the intermediate sensors 36B and 36D exhibit the detection mode and the end sensors 36A and 36E take the non-detection mode; the insertion of a 12 cm disc is completed.

Thus, the embodiment of FIGS. 13 and 14 permits handling of a disc in the structure such as the completion of insertion of a disc to be positively detected through the simple construction that a plurality of the sensors are arranged inside and outside the outer periphery of a disc set on the turntable.

The embodiments described above each may be constructed so as to improve a feeling of the operation as well as exhibit the foregoing advantages. Now, the improvement will be described in connection with the embodiment shown in FIGS. 3 and 7.

The central sensor 36C is arranged so as to be first closed by the deposited section 42a of the 8 cm disc or the deposited section 44a of the 12 cm disc when the 8 cm disc is inserted through the center of the disc port 24 into the structure or the 12 cm disc is inserted. The first and second intermediate sensors 36B and 36D are positively closed by the deposited section 42a of the 8 cm disc 42 or the deposited section 44a of the 12 cm disc when the 8 cm disc is inserted through the center of the disc port 24 or the 12 cm disc is inserted. When the 8 cm disc is inserted into the structure while substantially deviating in the lateral direction from the center of the disc port 24, the intermediate sensor 36B or 36D positioned in the direction opposite to the deviation is open. However, the deviation is not significant or large, both sensors 36B and 36D are kept closed. The central sensor 36C is disposed so as to somewhat deviate in the left direction from the vertical line extending through the center of the turntable 22 in FIG. 3; therefore, when the 8 cm disc is inserted while substantially deviating in the left direction in FIG. 3, the first intermediate sensor 36B is closed substantially concurrent with the central sensor 36C, whereas when it substantially deviates in the right direction, the second intermediate sensor 36D is closed prior to the central sensor 36C.

The first and second end sensors 36A and 36E are disposed so as to be positively closed by the deposited section 44a of the 12 cm disc 44 when it is inserted. Also, both sensors 36A and 36E are arranged so as to be laterally spaced by a distance larger than the diameter of the 8 cm disc from each other, so that at least one of them is open when the 8 cm disc is inserted. More particularly, as shown in FIG. 3, when the 8 cm disc is inserted through the center of the disc port 24, both end sensors 36A and 36E are open. When it is inserted while deviating in the left or right direction, the end sensor on the same side is closed but the end sensor on the opposite side is positively open.

Also, when the 12 cm disc 44 or 8 cm disc 42 is kept held on the transfer roller 26, at least three such sensors adjacent to each other are closed. When the 8 cm disc 42 inserted through the center of the disc port 24 or the 12 cm disc is held by the transfer roller 26, the centrally positioned three sensors 36B, 36C and 36D are closed. When the 8 cm disc is held on the transfer roller 26 while deviating in the left direction, the centrally positioned three sensors 36B, 36C and 36D or left three sensors 36A, 36B and 36C are closed or four sensors 36A, 36B, 36C and 36D are closed. When the 8 cm disc is held on the transfer roller 26 while deviating in the right direction, the centrally positioned three sensors 36B, 36C and 36D or right three sensors 36C, 36D and 36E are closed or four sensors 36B, 36C, 36D and 36E are closed.

Figure 15:
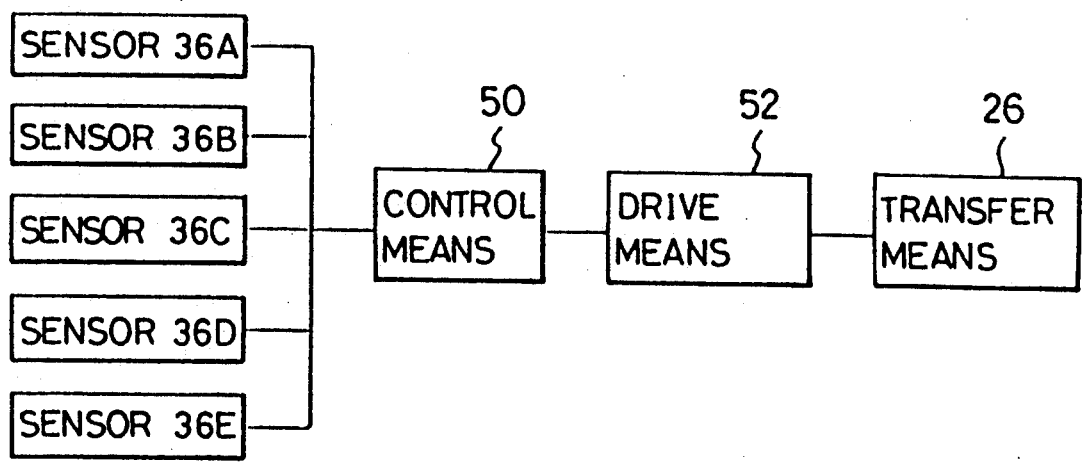
FIG. 15 is a block diagram showing still another embodiment of a disc ejecting structure according to the present invention.

To the sensors 36A to 36E may be connected the control means 50 in a manner as shown in FIG. 15. The control means 50 is adapted to judge the insertion of the disc depending upon a combination of detection signals supplied from the sensors to start the drive motor or means 52, to thereby rotate the transfer roller 26. In the control means 50, a predetermined time is set which initiates at the time when the insertion is detected. The time is set to be longer than at least a time between the detection of insertion of the disc and the disc holding by the transfer roller. Also, the control means 50 detects, depending upon a combination of detection signals supplied from the sensors after the detection of insertion of the disc, whether the disc is held by the transfer roller 26. When it is judged that the holding is carried out within the set time, the actuation of the drive means 52 is continued; whereas when it is judged that it is not carried out, the drive means 52 is stopped.

Figure 16:
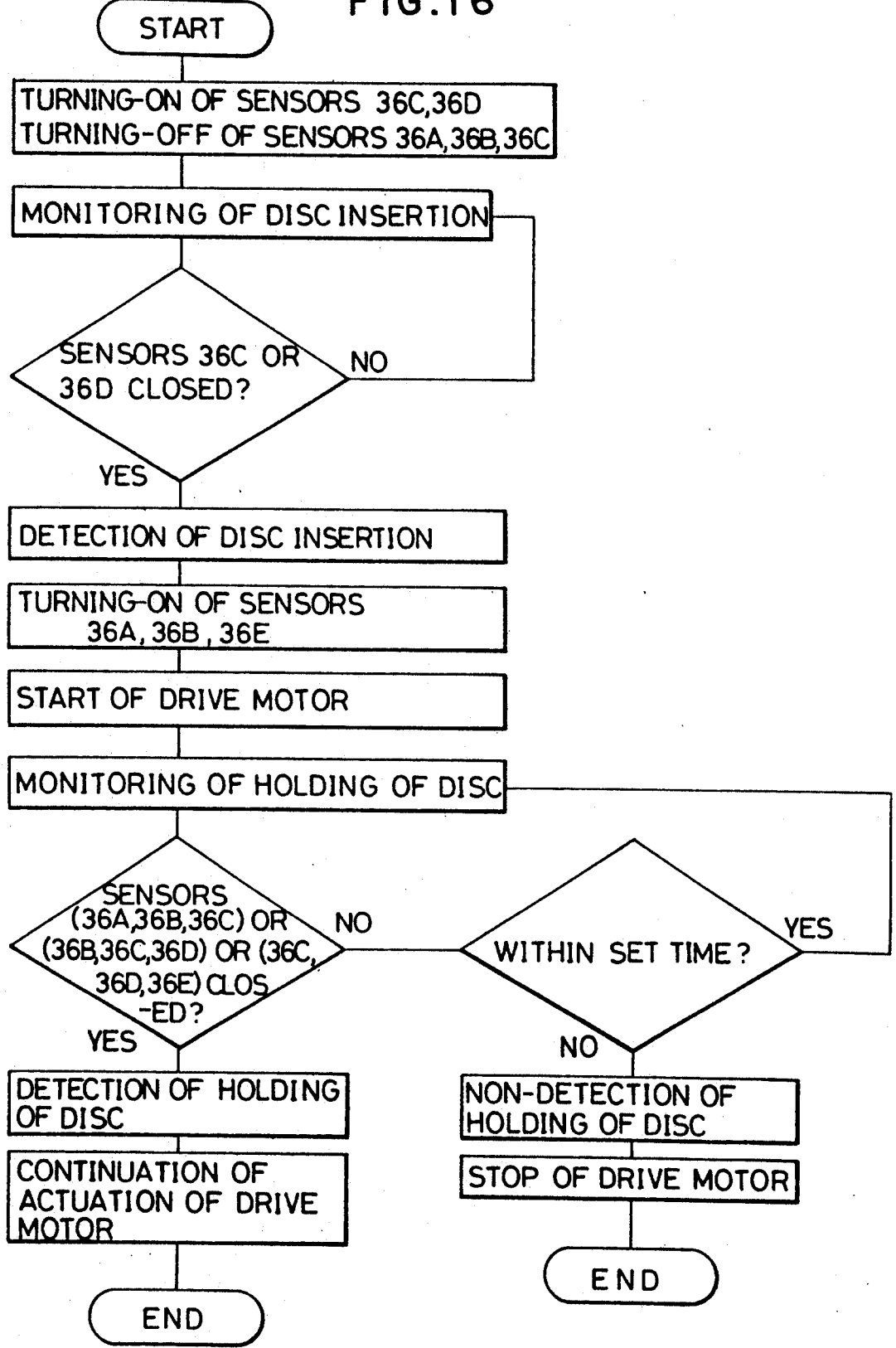
FIG. 16 is a flow chart showing the manner of operation of the disc ejecting structure shown in FIG. 15.

Now, the manner of operation of the structure will be described hereinafter with reference to FIG. 16.

(1) Monitoring of Insertion of Disc (Standby for Loading)

For the purpose of monitoring the insertion of the disc, only the central sensor 36C and second intermediate sensor 36D are turned on and the remaining sensors 36A, 36B and 36E are kept turned off. In a mounted-type acoustic equipment, it is required that a compact disc player mounted on a vehicle is ready for operation even when an engine of the vehicle is under non-operative conditions. However, the consumption of electric power must be minimized in view of the capacity of a battery of the vehicle. Thus, in the embodiment, only the sensors 36C and 36D which are initially closed during the disc insertion as described above are kept turned on.

(2) Detection of Insertion of Disc

As described above, it is judged that the insertion of the disc is accomplished when at least one of the central sensor 36C and second intermediate sensor 36D is closed during monitoring of the insertion. Then, the sensors 36A, 36B and 36E are immediately turned on to start monitoring of holding of the disc by the transfer roller 26 and start the drive means 52 to rotate the transfer roller 26.

(3) Detection of holding of Disc

When at least three adjacent sensors 36A, 36B and 36C; 36B, 36C and 36D; or 36C 36D and 36E are closed within the predetermined set time initiating at the time when the disc insertion is detected, to thereby generate the detection signals, it is judged that the disc inserted is held by the transfer roller 26, so that the actuation of the drive means is continued. The transfer roller 26 is previously rotated, so that loading of the disc is smoothly started without causing any shock at the time when the holding is carried out, resulting in improving the performance of the operation.

(4) Non-Detection of Holding of Disc

When at least three adjacent sensors described above are not closed within the set time, it is judged that the disc insertion is not sufficient to cause it to be held by the transfer roller 26, so that the actuation of drive means is stopped. Thus, the drive means is effectively prevented from being uselessly actuated.

As will be noted from the foregoing, in the illustrated embodiment, the central sensor 36C and second intermediate sensor 36D function to carry out both detection of insertion of the disc and the detection of holding of the disc by the transfer roller and the remaining sensors 36A, 36B and 36E function to carry out only the detection of the holding.

Alternatively, as shown in FIG. 7, the sensor 36G may be provided forward of the central sensor 35C for detecting only the disc insertion. In this instance, the five sensors 36A to 36E may be used for detecting only the holding. Such construction limits the number of sensors to be constantly turned on to only one and permits the disc insertion to be detected more rapidly.

The improvement in a feeling of the operation has been described in connection with a compact disc player which the 8 cm disc can be inserted through any place of the disc port. However, the present invention is likewise applicable to a disc player of the type that a disc is constantly inserted through the center of the disc port. In this instance, it is merely required to provide only one sensor for detecting the disc insertion and only one sensor for detecting the disc holding along the center of the structure, resulting in significantly reducing the number of sensors to be used for this purpose.

As can be seen from the foregoing, in the present invention, a plurality of the disc detecting sensors are arranged so that the disc which is in the course of ejection or at the ejection completing position is detected depending upon patterns of combination of detection and non-detection modes of the sensors. The present invention, irrespective of such simple construction, exhibits excellent advantages capable of positively detecting whether the disc is actually at the ejection completing position or the disc ejecting operation is actually carried out, resulting in preventing disadvantages such as useless actuation of the drive means, leaving of the disc as it is not ejected or the like.

While preferred embodiments of the invention have been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A disc ejecting structure for a disc player which includes a housing, a turntable arranged at the center of said housing, a disc port provided on the front side of said housing, a transfer means arranged between said turntable and said disc port so as to be rotatable in both directions, said transfer means rotating in one direction to transfer a disc to a position above said turntable during a disc loading operation and rotating in the other direction to transfer said disc from said position to an ejection completion position, a lifting means for vertically moving said disc between said position above said turntable and a disc setting position on said turntable, and a clamping means for clamping said disc set on said turntable, and a drive means for driving said transfer means, lifting means and clamping means, comprising:

an ejection detecting means for detecting the ejection of said disc to control said transfer means;

said ejection detecting means comprising a plurality of disc detecting means comprising a plurality of disc detecting sensors which are arranged on the way of a transfer passage from said disc port to said turntable in said housing and selectively exhibit detection mode and non-detection modes which are monitored in combination to provide patterns;

the plurality of disc detecting sensors constituting means for detecting the size of a transferred disc;

a disc positioning means for stopping the disc having a different size, transferred by said transfer means, at the center of said turntable in accordance with the size of a transferred disc discriminated by said disc detecting sensors;

a processing means for judging, depending upon said patterns, whether said disc is in the course of ejection or at said ejecting completion position, to thereby generate an ejecting operation detecting signal or an ejection completion detecting signal; and a control means connected to said processing means for carrying out starting, stopping or changing-over of said drive means depending upon said ejecting operation detection signal or ejection completion detecting signal input thereto or a time period at which said signal is input.

2. A disc ejecting structure as defined in claim 1, wherein five said sensors are arranged on the side of said transfer means facing said disc port.

3. A disc ejecting structure as defined in claim 1, wherein six said sensors are arranged on the side of said transfer means facing said disc port.

4. A disc ejecting structure as defined in claim 2, wherein said sensors are arranged substantially in a row in the lateral direction of said housing.

5. A disc ejecting structure as defined in claim 4, wherein said sensors include first and second end sensors constituting both ends of said row, a central sensor arranged substantially at the central position between said end sensors, and first and second intermediate sensors respectively arranged between said first and second end sensors and said central sensor.

6. A disc ejecting structure as defined in claim 1, wherein said sensors each comprise a light emitting diode and a light receptor.

7. A disc ejecting structure as defined in claim 5, wherein said sensors further include a second central sensor arranged in front of said central sensor.

8. A disc ejecting structure as defined in claim 1 further comprising a disc reloading detecting means arranged to detect said disc forced into the structure again, to thereby selectively supply a disc reloading command to said transfer means.

9. A disc ejecting structure as defined in claim 8, wherein said disc reloading detecting means is time-delayed with respect to said ejection detecting means.

10. A disc ejecting structure as defined in claim 8, wherein said disc reloading detecting means is arranged rearward of said ejection detecting means.

11. A disc ejecting structure as defined in claim 10, wherein said disc reloading detecting means is constructed by arranging said second end sensor rearward of said first end sensor.

12. A disc ejecting structure as defined in claim 11, wherein said disc discriminating means comprises two disc detecting sensors which exhibit said detection and non-detection modes and are arranged so as to be spaced by a distance larger than the diameter of small one of said discs and smaller than large one of said discs.

13. A disc ejecting structure as defined in claim 12, wherein said disc discriminating means comprises said two end sensors.

14. A disc ejecting structure as defined in claim 1 further comprising an insertion completion detecting means for detecting the completion of insertion of a different disc into said structure in accordance with the size of said disc.

15. A disc ejecting structure as defined in claim 1 further comprising a judging means for judging insertion of said disc and holding of said disc by said transfer means to control actuation of said drive means.

16. A disc ejecting structure as defined in claim 15, wherein said judging means, depending upon patterns of combination of detection and non-detection modes which said sensors exhibit during he disc inserting operation, detects whether said disc has been inserted through a disc port of the structure and actuates said drive means when the insertion is detected; and said judging means, depending upon patterns of combination of detection and non-detection modes which said sensors exhibit within a predetermined set time from the detection of the disc insertion, detects whether said disc has been inserted to a position at which the holding of said disc by said transfer means is carried out, and continues the actuation of said drive means when the insertion of said disc to said position is detected and stops the actuation of said drive means when the holding is not detected.

17. A disc ejecting structure for a disc player which includes a housing, a turntable arranged at the center of said housing, a disc port provided on the front side of said housing, a transfer means arranged between said turntable and said disc port so as to be rotatable in both directions, said transfer means rotating in one direction to transfer a disc to a position above said turntable during a disc loading operation and rotating in the other direction to transfer said disc from said position to an ejection completion position, a lifting means for vertically moving said disc between said position above said turntable and a disc setting position on said turntable, and a clamping means for clamping said disc set on said turntable, and a drive means for driving said transfer means, lifting means and clamping means, comprising:

an ejection detecting means for detecting the ejection of said disc to control said transfer means;

said ejection detecting means comprising a plurality of disc detecting sensors which are arranged on the way of a transfer passage extending between said disc port and said turntable in said housing and selectively exhibit detection mode and non-detection modes which are monitored in combination to provide patterns, said sensors including a first sensor on one side of the disc port which is forward of a second sensor on the other side of the disc port, the remaining plurality of disc detecting sensors being positioned between the first and second sensors;

a disc reloading detecting means positioned rearward of said ejection detection means and arranged so as to be time delayed with respect to said ejection detecting means to detect said disc forced into the structure again, to thereby selectively supply a disc reloading command to said transfer means;

a processing means for judging, depending upon said patterns, whether said disc is in the course of ejection or at said ejection completion position, to thereby generate an ejecting operation detecting signal or an ejection completion detecting signal, and a control means connected to said processing means for carrying out starting, stopping or changing-over a said drive means depending upon said ejecting operation detecting signal or ejection completion detecting signal input thereto or a time period at which said signal is input.

18. A disc ejecting structure for a disc player which includes a housing, a turntable arranged at the center of said housing, a disc port provided on the front side of said housing, a transfer means arranged between said turntable and said disc port so as to be rotatable in both directions, said transfer means rotating in one direction to transfer a disc to a position above said turntable during a disc loading operation and rotating in the other direction to transfer said disc from said position to an ejection completion position, a lifting means for vertically moving said disc between said position above said turntable and a disc setting position on said turntable, and a clamping means for clamping said disc set on said turntable, and a drive means for driving said transfer means, lifting means and clamping means, comprising:

an ejection detecting means for detecting the ejection of said disc to control said transfer means including a plurality of disc detecting sensor which are arranged on the way of a transfer passage extending between said disc port and a position predetermined forward of said transfer means in said housing and selectively exhibit detection mode and non-detection modes which are monitored in combination to provide discrete patterns;

a processing means for judging, depending upon said patterns, whether said disc is in the course of ejection or at said ejection completion position, to thereby generate an ejecting operation detecting signal or an ejection completion detecting signal, and a control means connected to said processing means for carrying out starting, stopping and changing-over operations of said drive means depending upon said ejecting operation detecting signal or ejection completion detecting signal input thereto or a time period at which said signal is input, including means for providing patterns of a combination of detection and non-detection modes which said sensors exhibit during the disc inserting operation to detect whether said disc has been inserted through a disc port of the structure and to actuate said drive means when the insertion is detected, the control means, depending upon the patterns of the detection and non-detection modes which said sensors exhibit within a predetermined set time period from the detection of the disc insertion, detecting whether said disc has been inserted to a position at which the holding of said disc by said transfer means is carried out, and continuing the actuation of said drive means when the insertion of said disc to said position is detected and stoping the actuation of said drive means when the holding operation is not detected.

* * * * *